United States Patent
Jaiswal et al.

(10) Patent No.: US 12,211,279 B2
(45) Date of Patent: Jan. 28, 2025

(54) SYSTEM AND METHOD FOR ARTIFICIAL INTELLIGENCE-BASED MEDIA MATCHING FOR AUTOMATING DOWNSTREAM MEDIA WORKFLOWS

(71) Applicant: PRIME FOCUS TECHNOLOGIES LIMITED, Bengaluru (IN)

(72) Inventors: Shubham Jaiswal, Morang (NP); Muralidhar Kolar Sridhar, Bengaluru (IN); Harish Shreedhara Bharadwaj, Bengaluru (IN); Chiranjit Ghosh, Bangalore (IN)

(73) Assignee: PRIME FOCUS TECHNOLOGIES LIMITED, Bengaluru (IN)

( * ) Notice: Subject to any disclaimer, the term of this patent is extended or adjusted under 35 U.S.C. 154(b) by 397 days.

(21) Appl. No.: 17/854,856

(22) Filed: Jun. 30, 2022

(65) Prior Publication Data
US 2023/0326211 A1 Oct. 12, 2023

(30) Foreign Application Priority Data
Mar. 24, 2022 (IN) .............................. 202241016735

(51) Int. Cl.
| | |
|---|---|
| *G06V 10/00* | (2022.01) |
| *G06V 10/50* | (2022.01) |
| *G06V 10/56* | (2022.01) |
| *G06V 10/74* | (2022.01) |
| *G06V 20/40* | (2022.01) |
| *H04N 21/485* | (2011.01) |

(52) U.S. Cl.
CPC ............ *G06V 20/49* (2022.01); *G06V 10/507* (2022.01); *G06V 10/56* (2022.01); *G06V 10/761* (2022.01); *H04N 21/485* (2013.01)

(58) Field of Classification Search
CPC ............ G06N 3/08; G06N 3/02; G06N 3/042; G06N 3/045; G06N 3/047; G06N 3/049; G06N 3/082; G06N 3/0475; G06N 3/0454; G06N 3/0464; G06V 10/507; G06V 10/761; G06V 20/46; G06V 20/49; H04N 21/485
See application file for complete search history.

(56) References Cited

U.S. PATENT DOCUMENTS

| | | | |
|---|---|---|---|
| 11,416,530 B1 * | 8/2022 | Chandrashekar | H04N 21/8549 |
| 11,482,243 B2 * | 10/2022 | Jamadagni | G11B 27/28 |
| 11,507,618 B2 * | 11/2022 | Venkataraman | G06Q 50/01 |

(Continued)

*Primary Examiner* — Amir Alavi
(74) *Attorney, Agent, or Firm* — Joy S. Goudie

(57) ABSTRACT

A system (700) including a media comparison engine (MCE) (507) and a method for determining matches between frames in media assets for automating downstream media workflows are provided. For a target master frame in each boundary of master shots of a master media asset (MMA), the MCE (507) performs a comparison with each source frame from each source media asset (SMA), in an optimal search space, using computed signatures; determines matches in the optimal search space; computes a rate of information exchange (RIE) score for each match based on the signature(s) and similarity scores of each source frame in a final search space; identifies a best match based on the RIE score of each match; performs a comparison of source frames subsequent to the best matching source frame with master frames subsequent to the target master frame.

18 Claims, 22 Drawing Sheets

(56) References Cited

U.S. PATENT DOCUMENTS

| | | | |
|---|---|---|---|
| 11,523,176 B1* | 12/2022 | Aher | H04N 21/4532 |
| 11,816,474 B1* | 11/2023 | Zafar | G06Q 30/0277 |
| 11,831,710 B2* | 11/2023 | Speasl | G06F 16/951 |
| 11,917,227 B2* | 2/2024 | Aher | G06F 40/205 |
| 11,934,438 B2* | 3/2024 | Chandrashekar | H04N 21/44204 |
| 11,949,971 B2* | 4/2024 | Surisetty | H04N 21/8549 |
| 12,033,672 B1* | 7/2024 | Karlin | G06T 5/77 |
| 2023/0326211 A1* | 10/2023 | Jaiswal | G06V 10/761 382/103 |
| 2024/0267573 A1* | 8/2024 | Tseng | G06T 7/194 |

* cited by examiner

SYSTEM AND METHOD FOR ARTIFICIAL INTELLIGENCE-BASED MEDIA MATCHING FOR AUTOMATING DOWNSTREAM MEDIA WORKFLOWS

BACKGROUND

Technical Field

The present invention is generally related to a field of creation of media contents such as video contents. The present invention is particularly related to a system and method for matching contents between two or more videos to perform various tasks such as re-telecast of old glorified content in HD/4k resolutions, comparing masters, retime subtitles, comparing compliance edits, finding redundancies to save space, using the audio from one video file as audio layers in another video file, etc. The present invention is more particularly related to a system and a method for comparing videos accurately for an efficient, accurate, sensitive, sensible and fast matching of video contents between frames in media assets automatically for downstream media workflows or downstream use cases using artificial intelligence and vision algorithms.

Description of the Related Art

In the present digital era, there has been an exponential growth in the amount of media content that is being created and re-purposed for consumption. There is a growing demand for higher resolution media for creating an enhanced, immersive viewing experience. In the media industry, there is a substantial need for matching content of two or more media assets, for example, videos, to perform various tasks such as re-telecasting of old, highly acclaimed content in high definition (HD) and 4000 (4K) screen resolutions, comparing master video files also referred to as "masters", retiming subtitles, comparing compliance edits, identifying redundancies to save space, using the audio from one video file as audio layers in another video file, etc. Most conventional content matching solutions are being performed manually and are, therefore, tedious and time-consuming in various media applications. Moreover, there is a challenge in detecting content in videos when multiple different image edits, such as, visual effects (VFX), crops, zooms, color grading, text differences, resolution changes, etc., have been performed in one of the videos, but not in the other videos.

Downstream media workflows comprising workflows, for example, for video conformance, video subtitle retiming, and digital intermediary (DI) validation are mostly performed manually. Hence, these media workflows are both time and resource consuming. Moreover, due to the various image manipulations performed and the length of the video duration to be matched or conformed, these media workflows are non-trivial and require experts, resulting in expensive task implementation. When a compliance edit is performed on a master video file, subtitles have to be frame-accurately retimed, which is typically performed manually and consumes more time and cost in a media workflow. Frame accuracy involves searching or locating and displaying content accurately at a frame level. When two master video files are compared for DI validation, each frame of each of the master video files needs to be manually verified to identify content segments that are missing, deleted, added, or edited to generate a DI validation report. This manual verification is a tedious task and must be frame-accurate, resulting in substantial costs and time consumption. Moreover, there are substantial costs involved in scanning and digitization of videos at high resolution. When a video has to be re-mastered at a high resolution from video tapes, there is a need for identifying what parts of the source content were selected and rendered in the master video file containing the final edited video, so that only those portions of the source content are scanned from the video tapes.

Moreover, there is a difficulty in differentiating between similar frames and same or identical frames. There is a need for categorizing images as mismatched, when although two images have a similar structure, there is a small change in an orientation of an object present in both the images. Furthermore, there is a need for a system and a method that automatically detects and responds to subtle changes, for example, changes in hand movements, facial expressions, etc., while accommodating image manipulations, such as, zooms, crops, resolution changes, visual effects, color grade changes, text differences, etc. Furthermore, there is a need for a frame-accurate matching technique for subtitle retiming and DI validation, and at most off by a couple of seconds, for video conformance.

Conventional automated or semi-automated solutions for comparison and conformance of videos typically implement content-based image retrieval query techniques, for example, reverse image search using various time and frequency domain algorithms. Other conventional solutions are implemented manually by professional editors by utilizing complex editing software for viewing thumbnails on a per second basis, and thereafter performing a manual frame level matching. Some of the conventional automated solutions utilize neural networks for executing frame matching, which are expensive to implement and require substantial training data.

Also, in the case of the conventional automated or semi-automated solutions for combining two videos (masters) at a different frame rate, there is an additional degree of complexity is involved, when the two masters are from two different geographical regions, for example, when the International Master is from one geographic region and the broadcast master from the other region.

Hence, there is a long-felt need for a system and a method for determining matches between frames in media assets for automating downstream media workflows using artificial intelligence, while addressing the above-recited problems associated with the related art.

OBJECTIVES OF THE EMBODIMENTS

The primary objective of the embodiments herein is to provide a system and a method for determining matches between frames in media assets, for example, videos, for automating downstream media workflows using artificial intelligence.

Another objective of the embodiments herein is to match frames of two or more media assets, for example, videos, to perform various tasks such as re-telecasting of old, highly acclaimed content in high definition (HD) and 4000 (4K) screen resolutions, comparing master video files, retiming subtitles, comparing compliance edits, identifying redundancies to save space, using the audio from one video file as audio layers in another video file, etc.

Another objective of the embodiments herein is to match frames of different frame rates of two or more media assets.

Yet another object of the embodiments herein is to execute a frame-accurate matching technique for frame-accurate subtitle retiming and digital intermediary (DI) validation, and at most off by a couple of seconds, for media conformance.

Yet another object of the embodiments herein is to perform fast identification of frame matches by executing a telescopic matching technique in at least two steps, and wherein the first step comprises identifying probable seconds that have potential source frames that match a target master frame by creating a corpus of source frames (the optimal search space) by selecting frames which are a good representation of the subsequent frames to follow, and wherein the second step comprises iterating all the source frames in the identified probable seconds to determine a match.

Yet another object of the embodiments herein is to compute a rate of information exchange (RIE) score for identifying matching frames, where a rate of change between adjacent source frames over a predefined duration of time is accumulated to determine the best possible match for a target master frame.

Yet another object of the embodiments herein is to compute a rate of information exchange (RIE) score for identifying matching frames, when the frame rate of the videos are mutually different to each other.

Yet another object of the embodiments herein is to execute a course correction mechanism for latching on to the exact matching source frame.

Yet another object of the embodiments herein is to automatically detect and respond to subtle changes, for example, changes in hand movements, facial expressions, etc., in media assets, while accommodating image manipulations and edits, for example, zooms, crops, resolution changes, visual effects (VFX), color grade changes, text differences, etc.

Yet another object of the embodiments herein is to categorize images as mismatched when two images have a similar structure, with a small change in an orientation of an object present in both the images.

Yet another object of the embodiments herein is to allow automatic verification of each frame of two master video files that are compared for DI validation for identifying content segments that are missing, deleted, added, or edited to generate a DI validation report.

Yet another object of the embodiments herein is to identify the parts of source content that are selected and rendered in a master video file containing a final edited video, so that only those portions of the source content are scanned from a plurality of video tapes, when a video has to be re-mastered at a high resolution from the plurality of video tapes.

Yet another object of the embodiments herein is to provide a graphical user interface for visualizing results of downstream media workflows comprising workflows, such as, for video conformance, video subtitle retiming, and DI validation.

Yet another object of the embodiments herein is to provide a graphical user interface that displays both videos to be matched, side by side, to allow viewing of real-time changes while any video segment or video is selected or played.

Yet another object of the embodiments herein is to provide a graphical user interface comprising a plurality of filters and user interface elements for performing a plurality of actions, such as, navigating between different categories, highlighting, panning, zooming, mapping clip timings, generating hovering effects, etc.

The objects disclosed above will be realized and achieved at least by the elements, features, and combinations particularly pointed out in the claims. The objects disclosed above have outlined, rather broadly, the features of the embodiments disclosed herein in order that the detailed description that follows is better understood. The objects disclosed above are not intended to determine the scope of the claimed subject matter and are not to be construed as limiting of the embodiments disclosed herein. Additional objects, features, and advantages of the embodiments herein are disclosed below. The objects disclosed above, which are believed to be characteristic of the embodiments disclosed herein, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The present invention addresses the above-recited need for a system and a method for determining matches between frames in media assets, such as videos, for automating downstream media workflows using artificial intelligence. The downstream media workflows comprise workflows, such as, (a) media conformance where a master media asset is compared with a plurality of source media assets, (b) subtitle retiming where the master media asset is compared with a single source media asset, and (c) digital intermediary (DI) validation where the master media asset is compared with a single source media asset. The system and the method disclosed herein execute one or more vision algorithms for an efficient, sensitive, sensible, and fast matching of media assets. The system and the method disclosed herein execute a combination of various imaging techniques to establish a one-to-one mapping between each frame in the media assets to be compared and conformed. The combination of these imaging techniques, which is used to develop a metric referred to as a rate of change of information flow in a space-time map, allows identification of matches of frames by analyzing the media assets.

According to one embodiment herein, the system disclosed herein comprises a plurality of processors, a non-transitory, computer-readable storage medium operably and communicatively coupled to the processors, and a media comparison engine. The media comparison engine is configured to define computer program instructions executable by the processors for determining matches between frames in media assets for automating downstream media workflows using artificial intelligence. In the method disclosed herein, the media comparison engine receives a message comprising a plurality of media assets for one or more of the downstream media workflows. The media assets comprise a master media asset and one or more source media assets corresponding to the master media asset. The media comparison engine extracts source frames constituting each of a plurality of source shots from each source media asset, and extracts master frames constituting each of a plurality of master shots from the master media asset.

The media comparison engine computes a plurality of signatures for each of the extracted source frames and each of the extracted master frames in a time domain. The signatures comprise frame derivatives, color information, and frame interest points. The frame interest points comprise, image key points and descriptors. According to an embodiment, the media comparison engine is configured to compute (a) the frame derivatives by executing a differential hashing algorithm, (b) the color information by executing a red, green, and blue (RGB) histogram algorithm, and (c) the frame interest points by executing one or more feature extraction algorithms. According to an embodiment, the media comparison engine determines performance of gamma correction on each of the extracted source frames and each of the extracted master frames prior to the computation of the frame interest points.

According to one embodiment herein, a parallel processing is used to speed up the entire process of signature computation. The number of frames for a given video is divided into batches, and each batch is processed by a separate processor core. Finally, all the batches are arranged based on their order of occurrence in the video.

The media comparison engine determines an optimal search space for scanning each of the extracted source frames of each source media asset. According to an embodiment, the media comparison engine determines the optimal search space by considering a given frame as a good representation of the subsequent frames to follow. Keeping this frame as the reference frame and using the frame derivatives computed in the prior step, each subsequent frame is compared with the reference frame until a frame is reached whose similarity score with the reference frame is less than an empirically determined pre-defined threshold. Thereafter, the frame in which the similarity threshold level is breached (is different), becomes (is considered or taken as) the new reference frame. This process continues until all the frames are mapped to one or the other reference frame. These set of reference frames comprise the optimal search space.

The media comparison engine computes boundaries of the master shots of the master media asset. According to an embodiment, the media comparison engine computes the boundaries of the master shots of the master media asset by matching color histograms of adjacent master frames of each of the master shots. According to an embodiment, the media comparison engine corrects the boundaries of the master shots of the master media asset using physical segments of the master media asset.

For a target master frame among the extracted master frames in each computed boundary of the master shots, the media comparison engine: (1) performs a comparison with each extracted source frames of each source media asset in the optimal search space using the computed signatures and determines the matches for the extracted source frames in the target master frame using the optimal search space; (2) computes a final search space by mapping all the determined matches of the extracted source frames in the optimal search space to their corresponding time elements, such as, seconds, and including source frames of the corresponding time elements in the final search space; (3) computes a rate of information exchange (RIE) score for each determined match based on one or more of the signatures and similarity scores computed for each of the source frames of each source media asset in the final search space; (4) identifies a best match of one of the source frames of one of the source media assets to the target master frame of the master media asset based on the RIE score of each of the determined matches; and (5) performs a comparison of the rest of the source frames to the target master frame of the master media asset, subsequent to the best matching source frame of that source media asset with the master frames, and determines matches of the subsequent source frames with the subsequent master frames of the master media asset.

The media comparison engine computes the RIE score for identifying the matching frames of two different frame rates, and wherein a rate of change between adjacent source frames over a predefined duration of time is accumulated to determine the best possible match for a target master frame. According to an embodiment, the media comparison engine identifies the best match of one of the source frames of the source media asset to the target master frame of the master media asset as follows: The media comparison engine determines probable time elements, such as, probable seconds, comprising potential source frames from among the source frames of each source media asset that are matching with the target master frame of the master media asset by creating a corpus of source frames. The media comparison engine identifies matches from among the potential source frames present in the probable time elements. The media comparison engine maps the identified matches of the potential source frames to their corresponding time elements and generates a final corpus of probable matches of the source frames. The media comparison engine then identifies the best match of one of the source frames to the target master frame from among the final corpus of the probable matches of the source frames based on the RIE score.

According to one embodiment herein, the media comparison engine executes a backward frame matching routine to determine whether any one of the master frames present before the target master frame finds a match in a same one of the source media assets. According to an embodiment, the media comparison engine generates a match summary list comprising, an index of matching master frames of the master media asset, indices of the source frames of the source media assets matched to the target master frame of the master media asset, a confidence score of the identified best match, scale differences between the determined best matches, and associated metadata based on the downstream media workflows.

According to one embodiment herein, According to one embodiment herein, the media comparison engine renders a graphical user interface (GUI) on a user device for visualizing results of the downstream media workflows comprising workflows, such as for video conformance, video subtitle retiming, and DI validation. The GUI comprises a plurality of filters and user interface elements for performing a plurality of actions, such as, navigating between different categories, highlighting, panning, zooming, mapping clip timings, generating hovering effects, etc. according to an embodiment herein, the GUI comprises one or more of a player section, segment-specific filters, a highlighter, and one or more of a plurality of control elements. The player section is configured to play the master frames of the master media asset and the source frames of each source media asset in a side by side manner for allowing a viewing of real-time changes. The segment-specific filters correspond to a plurality of categories for navigation between the categories on the GUI. The categories comprise, color difference, text difference, zoom difference, inserts, cuts, matches, mismatches, match with movement, etc. The highlighter comprises text nomenclature for highlighting a specific region inside segments of the media assets. The control elements are configured for managing the media assets. The control elements comprise, for example, pan, zoom, a clip timing mapper, hover, legends, timeline-based tracks, ranking-based play elements, a list export element, etc.

According to one embodiment herein, during the contiguous match finding phase, a very similar but not the exact matching block is mapped. The mapping happens due to subtle, miniscule differences in the frames that are to be matched. In an example, one frame displays a person with the mouth open, while the other frame displays the person with the mouth shut and all other components of the frames remain the same. This usually happens because of certain abrupt edits. To cater for the mentioned scenario, post finding of all the matches, a course correction check is initiated for each of the matching blocks, by checking the presence or availability of an unmatched block of source frames after the matched source block, and the availability or presence of better matches for the existing matched edit frames corresponding to the matched source block by comparing similarity scores of the prior and new images. When the presence of an unmatched block of source frames after the matched source block, and the availability or presence of better matches for the existing matched edit frames corresponding to the matched source block is found, the matched source-edit frame blocks are rearranged. This process is repeated iteratively until all the matching blocks are spanned, and the course correction check is no more (not) required for each of the matching blocks.

In one embodiment, an audio matching process is initiated by the media comparison engine to match the un-matched blocks. In this step, the media 'comparison engine checks in both the videos, if there is an unmatched block of equal duration between two matching blocks in both the compared and reference videos. If yes, the audio is extracted for those durations in both the videos, a spectrogram for both the audio segments is generated, followed by a difference hash computation of the individual spectrograms. If the hash difference between the spectrograms is greater than or equal to a predefined value, the segment is qualified as a matched segment and update the collated matching blocks to inculcate the matched frames in both the videos as matching blocks.

In the embodiments herein, related systems comprise circuitry and/or programming for effecting the present invention. According to an embodiment, the circuitry and/or programming are any combination of hardware, software, and/or firmware configured to implement the present invention depending upon the design choices of a system designer. Also, According to an embodiment, various structural elements are employed depending on the design choices of the system designer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The foregoing summary, as well as the following detailed description, is better understood when read in conjunction with the appended drawings. For illustrating the present invention, exemplary constructions of the present invention are shown in the drawings. However, the present invention is not limited to the specific methods and components disclosed herein. The description of a method step or a component referenced by a numeral in a drawing is applicable to the description of that method step or component shown by that same numeral in any subsequent drawing herein.

The specific features of the present invention are illustrated in some drawings and not in others for convenience only as each feature may be combined with any or all of the other features in accordance with the embodiments herein.

DETAILED DESCRIPTION OF THE EMBODIMENTS

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Figure 1A:
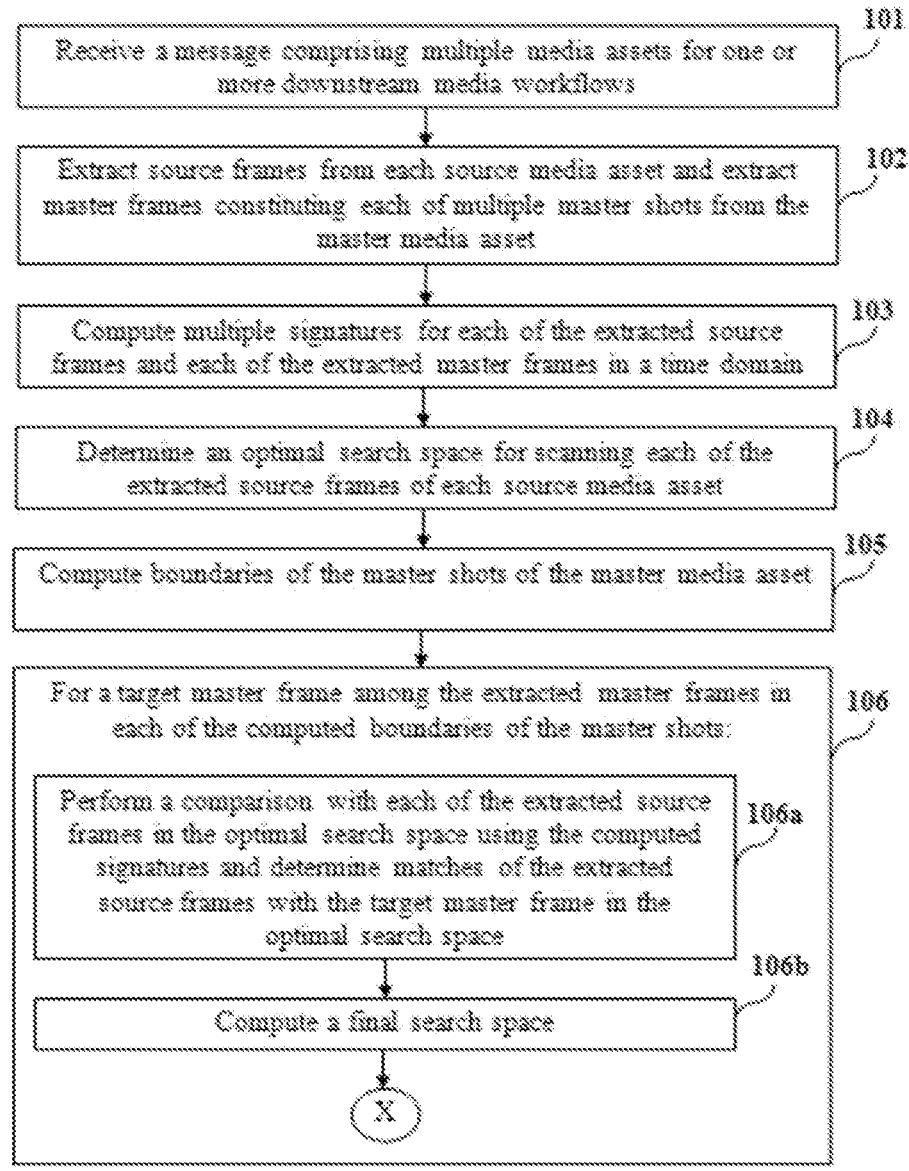
FIGS. 1A-1B illustrate a flowchart of a method for determining matches between frames in media assets for automating downstream media workflows using artificial intelligence, according to one embodiment herein.
Figure 1B:
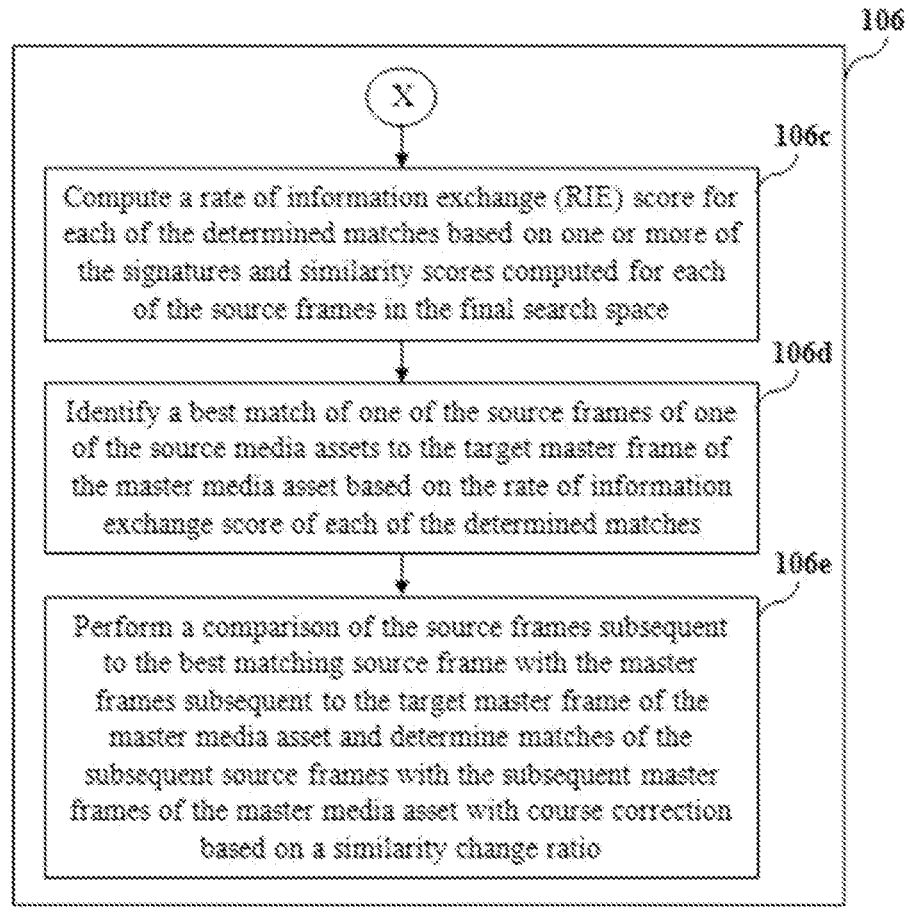

FIGS. 1A-1B illustrate a flowchart of a method for determining matches between frames in media assets for automating downstream media workflows using artificial intelligence, according to one embodiment herein. As used herein, "media asset" refers to a digital asset comprising media content, for example, audio content, image content, video content, audiovisual content, multimedia content, animations, textual content, sound effects, visual effects, graphics, etc., or any combination thereof. The media assets comprise a master media asset and one or more source media assets corresponding to the master media asset. As used herein, "master media asset" refers to a single, self-contained digital asset containing the high resolution, high quality version of the final edited media asset. For example, the master media asset is a master video file containing the final edited video. Also, as used herein, "source media assets" refers to digital assets in one or more media formats that are used for generating a master media asset. For example, source media assets are source rushes or source video files containing scenes or clips in one or more video formats that are used for generating a master video file. A media asset, such as, a video is typically composed of multiple scenes, each of which is composed of shots. According to an embodiment herein, each of these shots is a sequence of interrelated frames captured contiguously by a single image capture device in a particular time period. Each shot represents a continuous action in time and space.

The downstream media workflows comprise workflows, for example, for (a) media conformance where a master media asset is compared with multiple source media assets, (b) subtitle retiming where the master media asset is compared with a single source media asset, and (c) digital intermediary (DI) validation where the master media asset is compared with a single source media asset. Media conformance refers to a process in which N source media assets, for example, source video files, are scanned and compared against one final master media asset, for example, a master video file, to generate an output edit decision list (EDL). The edit decision list is then used to remaster content at high resolutions of, for example, about 2000 (2K) pixels, about 4000 (4K) pixels, or about 8000 (8K) pixels. Subtitling of a media asset, for example, a video, comprises retaining an original soundtrack of the video and overlaying audio transcript on the video in a textual form. Subtitles need to be synchronized with dialogues. When content of a media asset undergoes edits, for example, to fit the content within specified time frames, to provide cuts and zooms for addressing compliance or content moderation issues, to add extra frames with disclaimers, etc., the subtitles get out of sync with the dialogues and need to be retime coded, thereby requiring a subtitle retiming workflow. A digital intermediary or a digital intermediate (DI) refers to an intermediate asset with one or more manipulations and digitizations. The digital intermediaries of a media asset comprise, for example, scale changes such as crops, zooms, etc., color changes, textual anomalies, alternate edits, different aspect ratios, different resolutions, different captions, commercial breaks of different lengths, different channel brandings, different compliance edits, different texted overlays, and many other variations. DI validation refers to a process of determining and validating the variations or differences between segments in media assets.

According to one embodiment herein, the method disclosed herein employs a media comparison engine configured to define computer program instructions executable by multiple processors for determining matches between frames in media assets for automating downstream media workflows using artificial intelligence (AI). According to an embodiment, the media comparison engine is configured as an AI comparator. In the method disclosed herein, the media comparison engine receives 101 a message comprising multiple media assets for one or more of the downstream media workflows. The message comprises media content, for example, video content streamed from a distributed streaming platform such as the Apache Kafka® platform. The media assets comprise a master media asset and one or more source media assets corresponding to the master media asset. For example, for a media conformance workflow, the media comparison engine receives a message comprising a master media asset and multiple source media assets; for subtitle retiming, the media comparison engine receives a message comprising a master media asset and a single source media asset; and for DI validation, the media comparison engine receives a message comprising a master media asset and a single source media asset. The media comparison engine extracts 102 source frames constituting each of multiple source shots from each source media asset and extracts 102 master frames constituting each of multiple master shots from the master media asset.

The media comparison engine computes 103 multiple signatures for each of the extracted source frames and each of the extracted master frames in a time domain. As used herein, the term "signatures" refer to properties that describe a frame or an image of the frame. The signatures comprise, for example, frame derivatives, color information, and frame interest points. The frame interest points comprise, for example, image key points and descriptors. The frame derivatives are used to find the exact match by computation of a rate of information exchange (RIE) score as disclosed in the detailed description of FIGS. 3A-3B. The difference(s) of the frame derivatives between the target master frame and a reference source frame(s) is used for computation of the RIE score. The color information is used to validate the results of a frame derivatives matching technique, as the frame derivatives lead to false positives if the difference between two plain frames with varying colors is computed. Although the frame derivatives match for plain but variedly colored frames or images, the color information of these images does not match via histogram matching and the derivative-based match will be ignored. The color information is employed during the backward matching process after a contiguous block of frames are matched. The image key points and the image descriptors are used to find possible matches based on similarity in a populated search space with source frame indices. The image key points and the image descriptors are also used to determine an intrasecond average matching score by computation of the intrasecond similarity score. Moreover, when required, the image key points and the image descriptors are also used to find the rate of information exchange. To find a match based on the above signatures, the descriptors, that is, an array of numbers of an input source frame and the target master frame are compared. Two descriptors are said to be similar if the Euclidean distance between the two descriptors is less than a predetermined threshold of, for example, 0.7, and the total number of descriptors matched is greater than 10% of the total available descriptors for a given frame. Thereafter, for all the matched descriptors between a pair of frames, frame interest points are matched via the establishment of a valid homography between the pair of frames. If the number of frame interest points matched is greater than 50% of the total number of descriptor matches, the match is valid.

According to one embodiment herein, the media comparison engine is configured to compute (a) the frame derivatives by executing a differential hashing algorithm, (b) the color information by executing a red, green, and blue (RGB) histogram algorithm, and (c) the frame interest points by executing one or more feature extraction algorithms. According to an embodiment, the media comparison engine determines performance of gamma correction on each of the extracted source frames and each of the extracted master frames prior to the computation of the frame interest points.

Figure 2:
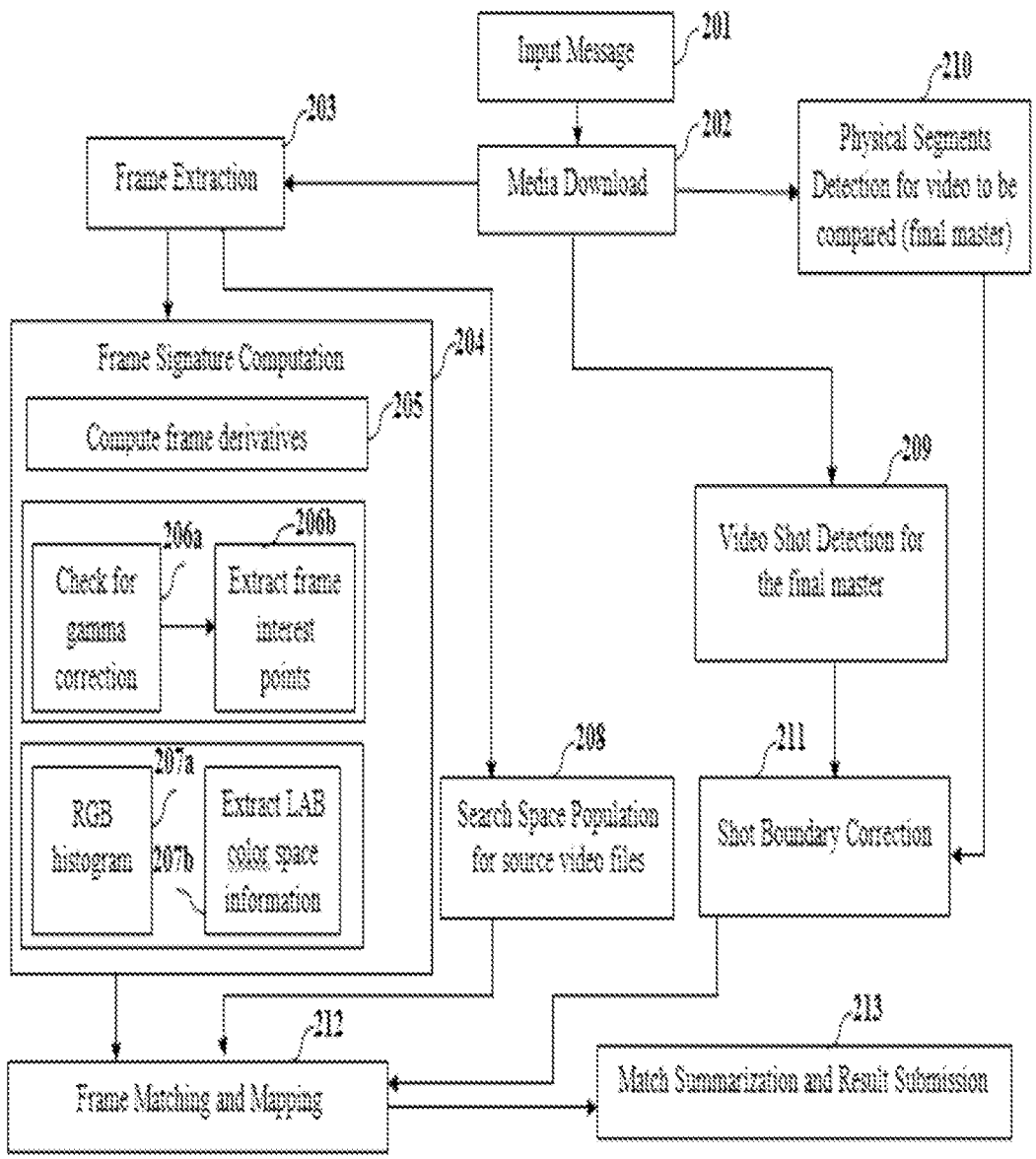
FIG. 2 illustrates a flowchart of an exemplary implementation of a method for determining matches between frames in videos for automating downstream media workflows using artificial intelligence, according to one embodiment herein.

The media comparison engine determines 104 an optimal search space for scanning each of the extracted source frames of each source media asset as disclosed in the detailed description of FIG. 2. According to an embodiment herein, the search space computation is a determining factor for the overall time required for the conform/compare process. Bigger the search space, the higher the number of images that are scanned for determining a corresponding match. To mitigate this problem, an optimal search space is obtained by using a frame optimization technique which uses the differential hashes computed apriori to loop across all the frames in both the videos and identify a unique frame which is a good representation of the subsequent frames that follow. For this, each of the frames is looped over and checked whether the hash difference is greater than a predetermined empirical value. When the hash difference exceeds the empirical value, a new parent frame is chosen and the process continues until all the unique frame representations have been obtained.

The media comparison engine computes 105 boundaries of the master shots of the master media asset. According to an embodiment, the media comparison engine computes the boundaries of the master shots of the master media asset by matching color histograms of adjacent master frames of each of the master shots. According to an embodiment, the media comparison engine corrects the boundaries of the master shots of the master media asset using physical segments of the master media asset.

Figure 3A:
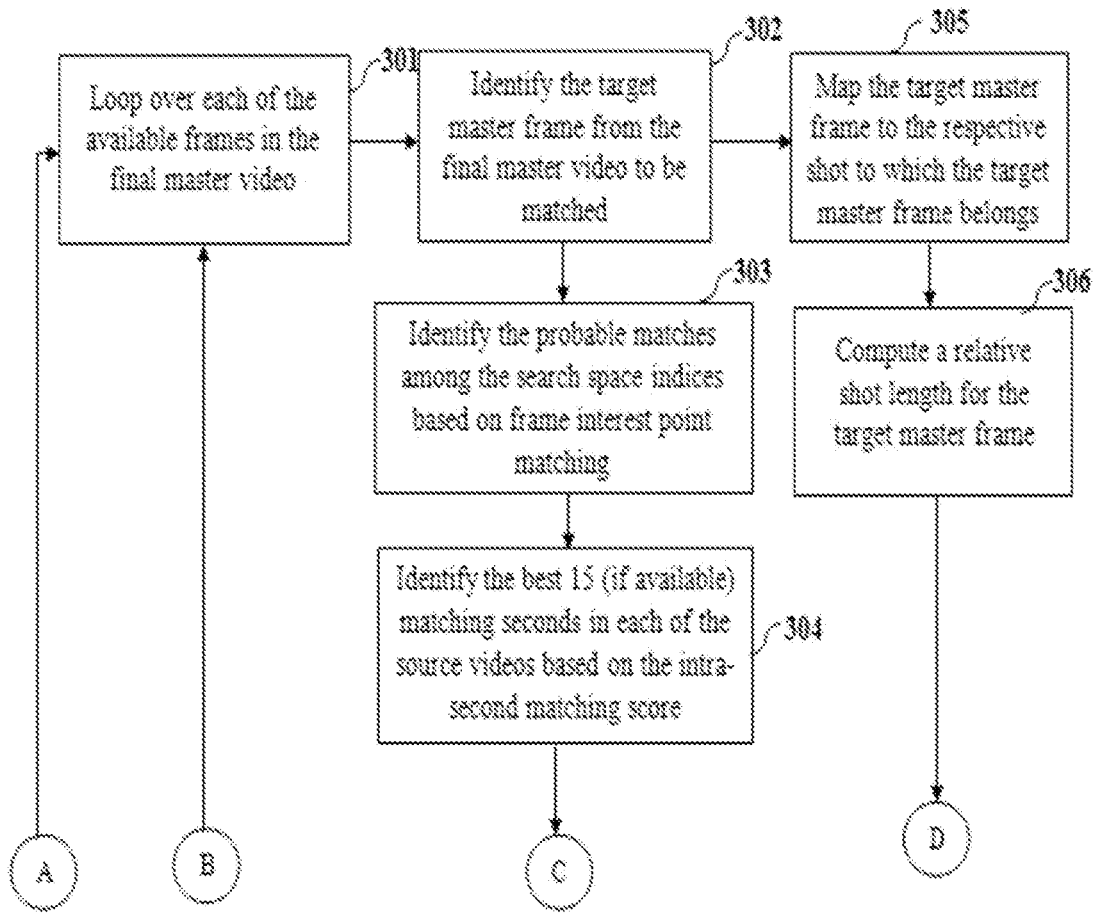
FIGS. 3A-3B illustrate a flowchart of a method for executing frame matching and mapping, according to one embodiment herein.
Figure 3B:
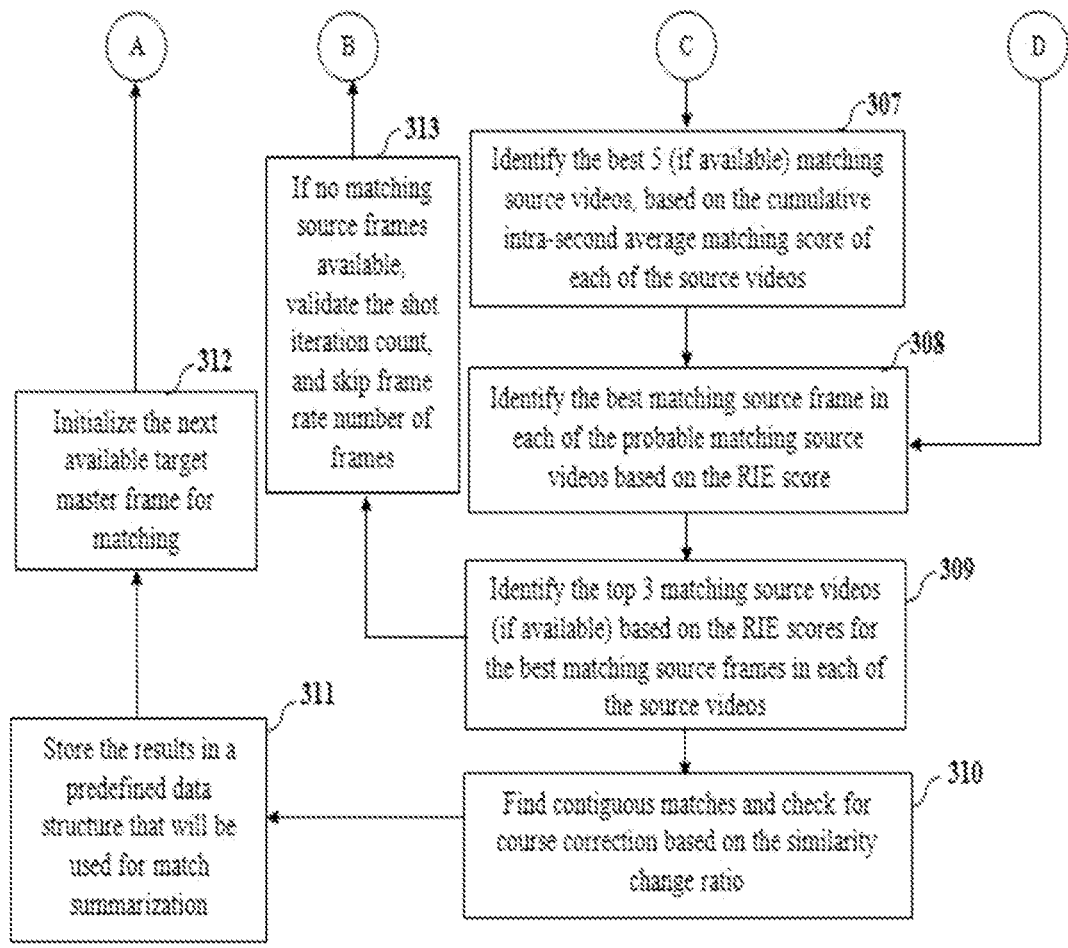

For a target master frame among the extracted master frames in each of the computed boundaries of the master shots 106, the media comparison engine: performs a comparison with each of the extracted source frames of each source media asset in the optimal search space using the computed signatures and determines matches of the extracted source frames with the target master frame in the optimal search space (106a); computes a final search space by mapping all the determined matches of the extracted source frames in the optimal search space to their corresponding time elements, for example, seconds, and including source frames of the corresponding time elements in the final search space (106b); computes a rate of information exchange (RIE) score for each of the determined matches based on one or more of the signatures and similarity scores computed for each of the source frames of each source media asset in the final search space (106c); identifies a best match of one of the source frames of one of the source media assets to the target master frame of the master media asset based on the RIE score of each of the determined matches (106d); and performs a comparison of the source frames subsequent to the best matching source frame of that source media asset with the master frames subsequent to the target master frame of the master media asset and determines matches of the subsequent source frames with the subsequent master frames (106e) as disclosed in the detailed description of FIGS. 3A-3B.

The media comparison engine executes a course correction mechanism for latching on to the exact matching source frame. During the contiguous match finding phase, a substantially similar but not the exact matching block is matched and mapped because of subtle, miniscule differences in the frames that are matched. For example, one frame may have an actor's mouth open, while the other frame may have the actor's mouth shut, with all other components of the frames remaining the same. The subtle differences in the frames occur, for example, due to abrupt edits. In order to correct the subtle differences present in the matched frames, a similarity change ratio is computed between the adjacent frames after every match, and when the similarity change ratio exceeds a certain threshold (typically more than double), the media comparison engine initiates a check/alarm through an algorithm to determine the validity of this alarm by searching for an alternate matching process, to compute an image similarity score for each matched frames.

According to one embodiment herein, the media comparison engine computes the RIE score for identifying matching frames, as disclosed in the detailed description of FIGS. 3A-3B, wherein a rate of change between adjacent source frames over a predefined duration of time is accumulated to determine the best possible match for a target master frame. According to an embodiment, the media comparison engine identifies the best match of one of the source frames of the source media asset to the target master frame of the master media asset as follows: The media comparison engine determines probable time elements, such as, seconds, comprising potential source frames from the source frames of each source media asset, comprising a match for the target master frame of the master media asset, by creating a corpus of source frames (optimal search space). The media comparison engine identifies matches from the potential source frames in the probable time elements. The media comparison engine maps the identified matches of the potential source frames to their corresponding time elements and generates a final corpus of probable matches of the source frames. The media comparison engine then identifies the best match of one of the source frames to the target master frame from among the final corpus of the probable matches of the source frames based on the RIE score.

According to one embodiment herein, the media comparison engine executes a backward frame matching routine to determine whether any of the master frames before the target master frame finds a match in a same one of the source media assets as disclosed in the detailed description of FIGS. 3A-3B. According to an embodiment, the media comparison engine generates a match summary list based on the downstream media workflows as disclosed in the detailed description of FIG. 4. The match summary list comprises, for example, an index of matching master frames of the master media asset, indices of the source frames of the source media assets matched to the target master frame of the master media asset, a confidence score of the identified best match, scale differences between the determined best matches, and associated metadata.

According to one embodiment herein, the media comparison engine renders a graphical user interface (GUI) on a user device for visualizing results of the downstream media workflows comprising workflows, for example, for video conformance, video subtitle retiming, and DI validation as disclosed in the detailed descriptions of FIGS. 8A-8D and FIGS. 9-15. The GUI comprises multiple filters and user interface elements for performing multiple actions, for example, navigating between different categories, highlighting, panning, zooming, mapping clip timings, generating hovering effects, etc. For example, the GUI comprises one or more of a player section, segment-specific filters, a highlighter, and one or more of multiple control elements. The player section is configured to play the master frames of the master media asset and the source frames of each source media asset side by side for allowing viewing of real-time changes. The segment-specific filters correspond to multiple categories for navigation between the categories on the GUI. The categories comprise, for example, color difference, text difference, zoom difference, inserts, cuts, matches, mismatches, match with movement, etc. The highlighter comprises text nomenclature for highlighting a specific region inside segments of the media assets. The control elements are configured for managing the media assets. The control elements comprise, for example, pan, zoom, a clip timing mapper, hover, legends, timeline-based tracks, ranking-based play elements, a list export element, etc.

FIG. 2 illustrates a flowchart of an exemplary implementation of a method for determining matches between frames in videos for automating downstream media workflows using artificial intelligence, according to one embodiment herein. In the method disclosed herein, the media comparison engine receives and parses an input message 201, for example, a Kafka® message with associated process information for downloading 202 the required media assets, for example, video files, for processing. An example representation of a Kafka® message with associated process information is disclosed below.

{"jobName":"assetxyz_06102020","sourceVideo-FilesList":["path/to/cloud/video_1.mp4","path/to/cloud/video_2.mp4","path/to/cloud/video_3.mp4", "video_4.mp4"], "compared FinalMaster":"path/to/cloud/final_master.mp4". "cloudAccessTokens": "accessToken","r estApiUrl":"https://api_url_for_sending_job_response","restApiToken": "rest_access_to ken"}

The media comparison engine then performs frame extraction 203 on the downloaded video files. In the frame extraction process, the media comparison engine reads through each of the frames in a video and saves the frames to a data storage device, for example, a data disk, from where the frames are consumable by other services. According to an embodiment, the media comparison engine employs batch processing for frame extraction, where the batch size is governed by the number of available processor cores in a cloud server that hosts the media comparison engine. The frame extraction process renders a data structure that stores a path of the extracted frames for each of the video files. An example representation of the data structure that stores the path of the extracted frames for each of the video files is disclosed below.

Source_frames_path_list: {"path/to/extracted/frames/for/video_1","path/to/extracted/frames/for/video_2", "path/to/extracted/frames/for/video_3"}
Final_master_frames_path:{"path/to/extracted/frames/for/final_master"}

Following the frame extraction process, the media comparison engine performs a frame signatures computation 204. The media comparison engine computes various signatures for all the frames of each of the videos. For example, the media comparison engine computes frame derivatives, color information, and image descriptors and key points that are together referred to as image or frame interest points. According to an embodiment, the media comparison engine computes 205 the frame derivatives based on a differential hashing method with, for example, a hash size of 32, as a hash size of 32 has been observed to be near optimal to capture subtle differences, for example, hand movements, facial expressions, etc., between two images. An example representation of a data structure in a 32×32 matrix of frame derivatives for a frame or an image is disclosed below.

array ([[False, False, False, . . . , False, False, True],
[False, False, False, . . . , False, False, False],
[False, False, False, . . . , False, False, False],
. . . ,
[False, True, False, . . . , False, True, False],
[False, True, True, . . . , False, False, False],
[False, False, True, . . . , False, False, True]])

According to one embodiment herein, the media comparison engine captures color information for a frame by employing a red, green, and blue (RGB) histogram 207a, for example, an 8-bin histogram. The media comparison engine utilizes the color information for differentiating between plain images and transitions, for example, fade-ins and fade outs. An example data structure representing the color information or the histogram for a frame or an image is disclosed below.

{0: [[[0, 0], 46]],
1: [[[0, 0], 1], [[1, 1], 1141], [[1, 2], 23], [[2, 2], 5]],
2: [[[1, 1], 4], [[2, 1], 16], [[2, 2], 1645], [[2, 3], 10], [[3, 3], 5]]
3: [[[2, 2], 1], [[3, 2], 4], [[3, 3], 939]], 4: [ ],5: [ ],6: [ ],7: [ ]

According to one embodiment herein, the media comparison engine further extracts 207b LAB color space information for each frame, where "L" denotes lightness from black (0) to white (100), "A" denotes green (−) to red (+), and "B" from blue (−) to yellow (+). The media comparison engine utilizes the LAB space information for identifying color grade differences in the frames. According to an embodiment, the media comparison engine extracts 206b the frame interest points using feature extractor techniques that are scale invariant. The frame interest points are a combination of image key points and descriptors. The frame interest points allow the media comparison engine to identify matches of frames with change in scale, addition of visual effects, etc. An example data structure representing the frame interest points computed for a frame or an image is disclosed below.

([<KeyPoint 0x7f13e71142d0)>, <KeyPoint 0x7f13e7114540>], array ([[0, 0, 0, 0, 52, 11, 0, 0, 44, 1, 0, 0, 160, 13, 0, 2, 167, 2, 0, 0, 12, 1, 0, 14, 46, 1, 0, 0, 0, 0, 5, 17, 0, 0, 0, 8, 71, 4, 0, 0, 48, 6, 1, 12, 167, 6, 0, 1, 167, 23, 0, 2, 16, 1, 0, 11, 71, 1, 0, 0, 0, 1, 9, 20, 0, 0, 0, 11, 78, 1, 0, 0, 49, 1, 0, 8, 167, 7, 1, 4, 167, 3, 0, 0, 16, 2, 0, 21, 86, 4, 0, 0, 0, 0, 1, 7, 0, 0, 0, 13, 64, 0, 0, 0, 44, 0, 0, 9, 142, 2, 0, 5, 167, 1, 0, 0, 10, 1, 0, 19, 59, 4, 1, 0, 0, 0, 0, 2], [0, 0, 0, 11, 69, 1, 0, 0, 43, 6, 0, 6, 161, 11, 0, 3, 166, 22, 0, 1, 10, 2, 0, 10, 53, 2, 0, 0, 0, 0, 3, 8, 0, 0, 0, 6, 88, 1, 0, 0, 56, 3, 0, 6, 166, 11, 0, 4, 166, 9, 0, 1, 14, 2, 0, 12, 73, 5, 1, 1, 0, 0, 0, 1, 0, 0, 0, 14, 82, 0, 0, 0, 59, 1, 0, 7, 166, 5, 0, 6, 166, 4, 0, 0, 15, 1, 0, 21, 68, 4, 1, 1, 0, 0, 0, 2, 0, 0, 0, 7, 63, 1, 0, 0, 51, 0, 0, 2, 129, 7, 0, 6, 166, 0, 0, 0, 8, 1, 0, 24, 49, 1, 0, 0, 0, 0, 0, 4]], dtype=uint8))

Prior to feature extraction, the media comparison engine analyzes each image to determine whether a gamma correction 206a is to be performed on the image. The media comparison engine performs gamma correction to match a dark image obtained by manipulating a high intensity, bright image. While the frame derivatives ensure sensitivity to minute details, the frame interest points cater to sensibility, thereby, making the methodology "sensibly sensitive".

Since the number of available frames for which the signatures are to be computed is, for example, between about 0.1 to more than 1.5 million frames depending on the number of available videos, according to an embodiment, the media comparison engine implements parallel processing to speed up the entire process of signature computation. The media comparison engine divides the number of frames of a video into batches and processes each batch using a separate processor core. The media comparison engine then arranges the batches based on their order of occurrence in the video. Following the computation of the signatures of each of the frames, the media comparison engine computes a search space and performs search space population 208. The computation of the search space is a determining factor for the overall time required for the conformance and comparison process. Larger the search space, the higher the number of frames or images that are scanned for determining a corresponding match. According to an embodiment, to mitigate the problem of the higher number of frames or images that are scanned for determining a corresponding match, the media comparison engine determines the optimal search space using frame optimization technique, which uses the differential hashes computed apriori to loop across all the frames in both the videos and identify a unique frame (parent frame) which is a good representation of the subsequent frames that follow. Further, the media comparison engine loops over each of the frames and check whether the hash difference is greater than a pre-determined empirical value. When the hash difference exceeds the empirical value a new parent frame is chosen, and the process continues until all the unique frame representations have been obtained.

Therefore, for a video conformance process that involves searching, for example, about 6 to 10 hours of media content, that is, about 600000 frames to about 1000000 frames for matching about 20 minutes to about 45 minutes of a final master video containing about 30000 frames to about 70000 frames, in this example, the media comparison engine performs a scan of about 75000 frames to about 160000 frames. In this example, the search space numbers for a typical subtitle retiming and digital intermediary (DI) validation process involving two one-hour contents are about 10000 frames to about 15000 frames.

On performing the search space population, the media comparison engine outputs an array of key-value pairs, where the key is a name of the source video and the value is a list of frame indices to search. An example representation of a search space for the first 2 seconds of three videos at a frame rate of 29.97 is disclosed below.

("video_1": [4,12,20,27,34,42,50,57], "video_2": [4,12, 20,27,34,42.50,57], "video_3": [4,12,20,27,34,42,50, 57];

Furthermore, the media comparison engine computes and corrects 211 shot boundaries for the final master video to be compared with the source videos. A shot is a meaningful, comprehensible sequence of frames within a video. The media comparison engine requires accurate shot boundaries to ensure a smooth frame matching process. The accurate shot boundaries are required because during the frame matching process, to identify a contiguous matching block of frames, the media comparison engine computes a rate of information exchange (RIE) score, the boundaries for the calculation of which are governed by shot entry and exit points. The media comparison engine executes a shot detection process 209 based on matching color histograms of adjacent frames. The media comparison engine groups all the contiguous blocks of frames with similar color distribution as part of the same shot.

According to one embodiment herein, the media comparison engine makes an application programming interface (API) call to a vision cloud segmentation engine via a representational state transfer (REST) methodology, for detecting 210 and accessing physical segments, for example, bars, tones, slates, blacks, etc., of each frame of each shot with fade-in and fade-out transitions. Also, the media comparison engine makes an application programming interface (API) call to a vision cloud segmentation engine via a representational state transfer (REST) methodology, for marking the available the shot boundaries of all the physical segments. The API call comprises a video path to locate the final master video in the cloud storage. The vision cloud segmentation engine computes frame-accurate timecodes of all the physical segments in the input uploaded master video and returns the output of the video segmentation process for shot boundary correction. The media comparison engine receives the output of the segmentation process from the vision cloud segmentation engine and corrects 211 the shot boundaries using the detected physical segments in the output. An example of a data structure representing the computed shot boundaries for a 10-second final master video at a frame rate of 29.97 with a total of 300 frames is [(0,50), (50,200), (200,300)].

After completion of the frame signature computation 204, the search space population 208, and the shot boundary correction 211, the media comparison engine executes frame matching and mapping 212 using the computed search space, the shot boundary information, and the signatures. The media comparison engine executes frame matching and mapping to identify the matches between the source video file(s) and the final master video file as disclosed in the detailed description of FIGS. 3A-3B. The media comparison engine then performs match summarization and result submission 213 using the output of frame matching to generate an edit decision list (EDL) response and populate a data structure, for example, in a JavaScript Object Notation (JSON) format with output information required for visualization of the matched and unmatched block of frames on a graphical user interface.

FIGS. 3A-3B illustrate a flowchart of a method for executing frame matching and mapping, according to one embodiment herein. In the frame matching and mapping process, the media comparison engine iterates through each of the shot boundaries of the final master video file. That is, the media comparison engine loops 301 over each of the available master frames in the final master video file. The media comparison engine selects the first frame of the shot boundary being iterated as the target master frame 302 for finding a corresponding match. As each shot is a logical sequence of frames, if a corresponding match for the first master frame is found, the frames to follow will also be matched from the same source video file in case of video conformance and from the same shot in case of video subtitle retiming and digital intermediary (DI) validation.

In the workflow for video conformance, for example, the media comparison engine scans a batch of "m" video search space indices in each iteration. After all the search space indices are scanned for all the source video files, the media comparison engine identifies 304, for example, the best 15 matching seconds, that is, a final search space, if available, in each source video file. The media comparison engine performs the matching process 303 based on matching of the frame interest points and computes an image similarity score (ISS), also referred to as a "frame similarity score", for each of the source frames in the search space indices. The image similarity score is, for example, a number between 0 to 1, which indicates the similarity of two images or frames. The higher the image similarity score, the more similar are the images or the frames. An example data structure representing the image similarity scores corresponding to the search space indices of the first 2 seconds of three videos with frame number 100 in the final master video is disclosed below, where each entry of the data structure is to be read as (frame number, image similarity score):

{"video_1": [(4,0.0), (12,0.0), (20,0.0), (27,0.0), (34,0.0), (42,0.0), (50,0.0), (57,0.0)], "video_2"; [(4,0.4). (12, 0.6), (20,0.5), (27,0.35), (34,0.25), (42,0.1), (50,0.0), (57,0.0)], "video_3": [(4,0,0), (12,0,0), (20,0.0), (27, 0.0), (34,0.0), (42,0.0), (50,0.0). (57,0.0)]}

For identifying a predetermined number of matching seconds, for example, the best 15 matching seconds in each of the source video files, according to an embodiment, the media comparison engine computes an intra-second matching score for each of the source frames and sorts the source frames in a descending order of the intra-second matching scores. According to an embodiment, the media comparison engine computes the intra-second matching score by summing up the individual image similarity scores for each of the search space indices belonging to a given second. Higher the intra-second matching score for a target master frame, that is, the query master frame for which the match is to be found, the better is the likelihood that the target master frame was taken from the given source video file. Furthermore, according to an embodiment, the media comparison engine computes an intra-second average matching score for a given source video based on the average of the intra-second matching scores. The media comparison engine filters out and identifies 307 a predetermined number of source video files, for example, the best 5 source video files, if available, where the target master frame found a match, using the intra-second average matching score of each of the source video files. An example data structure representing the intra-second average matching score for the above array of the image similarity scores is disclosed below, where each entry of the data structure is to be read as (second index, intra-second average matching score): "video_1":[(0,0.0), (1,0.0)], "video_2":[(0,0.46). (1,0.08)], "video_3":[(0,0.0). (1,0.0)]}

Thereafter, the media comparison engine iterates all the frames of each of the best matching seconds for each of the probable matching source video files to find an exact match index of the target master frame. This method of first finding the probable matching seconds and then delving into each of the seconds to find an exact match is referred to as a telescopic matching technique. Media comparison, for example, video comparison, comprises matching "m" final cut, master video frames to "n" source video frames. When the values of "m" and "n" are large, for example, greater than 100000 frames, sequential matching typically comprises m*n frame comparisons. In the telescopic matching technique, rather than finding a match in one attempt, according to an embodiment, the media comparison engine divides the matching process into two steps. The first step of the matching process comprises finding probable seconds, for example, at most "x" seconds, that may have potential source frames that are a match for a target master frame by creating a corpus of source frames (optimal search space). Thereafter, when these probable seconds are determined, the media comparison engine iterates all the source frames in these probable seconds to determine a match. The media comparison engine reduces the total comparisons to a p (total number of frames in the optimal search space) number of comparisons rather than "n" comparisons and allows a fast comparison of frames. By executing the telescopic matching technique, the media comparison engine reduces the number of computations for finding a match, thereby aiding the overall reduction of the time taken in the video conformance process. The telescopic matching technique, therefore, allows a fast identification of frame matches.

The media comparison engine maps 305 the target master frame to a respective shot to which the target master frame belongs. According to an embodiment, to find an exact match, the media comparison engine computes 306 a relative length of the shot to which the target master frame belongs. Thereafter, the media comparison engine determines the first match among all the frames in the final search space by matching the descriptors as well as the image key points with those of the target master frame. Furthermore, the media comparison engine computes a rate of information exchange (RIE) metric, herein referred to as the RIE score, for identifying matching frames. For any two sets of video blocks to match correctly, every alternate frame in both the videos should vary proportionately with respect to information content. That is, the delta change in the variation between two adjacent frames in two matching videos should be similar or the same. In the method disclosed herein, the media comparison engine accumulates this rate of change between adjacent frames over a duration of time that is dynamically calculated during runtime, to determine the best possible match for a target master frame. The duration of time is governed by the ability to continuously match alternate pair of frames in both the videos. The media comparison engine performs the accumulation as two blocks of contiguous frames may appear substantially similar over a short duration of time, but gradually differ thereafter.

For computing the RIE score, the media comparison engine determines whether there is a scale difference between the target master frame and the matched source frame by checking whether the difference between the frame derivatives of the frames is, for example, below a 75% threshold, that is, a difference of 256 bits derived empirically. The frame derivatives are also referred to as "image derivatives". If there is a scale difference, the media comparison engine computes the RIE score based on the image similarity scores. If there is no scale difference, the media comparison engine computes the RIE score using the differences in the image derivatives. The media comparison engine computes an image derivative difference (IDD) score as a difference between the image derivatives of any two adjacent frames.

To compute the RIE score for a given match, the media comparison engine computes and averages the IDD scores or the image similarity scores for all the subsequent master frames after the target master frame in the final master video and the matching source frame in the given source video for the relative shot length number of master frames. The RIE score serves as a base score for determining the accurate matching source frame for a given target master frame. Examples RIE scores computed for a sample of 10 contiguous frames for frame numbers 10, 12, 20, and 34 of source video_2 in continuation with the example representations above are disclosed below:

$RIE_{10}$=sum ([0.65,0.65,0.66,0.65,0.65,0.67,0.68, 0.67,0.65])/10=6.59/10=0.65

$RIE_{12}$=sum ([0.6,0.58,0.57,0.55,0.52,0.5,0.5,0,45,0.45, 0.42])/10=5.14/10=0.51

$RIE_{20}$=sum ([0.5,0.5,0.47,0.45,0.45,0.43,0,4,0.38,0.35, 0.35])/10=4.28/10=0.42

$RIE_{34}$=sum ([0.25,0.25,0.2,0.2,0.18,0.15,0.1,0.1,0.07, 0.03])/10=1.53/10=0.15

In the above examples, for the computation of $RIE_{10}$, the media comparison engine computes the image similarity scores between frame numbers 10 to 19 of source video_2 with frame numbers 100 to 109 of the final master video; for the computation of $RIE_{12}$, the media comparison engine computes the image similarity scores between frame numbers 12 to 21 of source video_2 and frame numbers 100 to 109 of the final master video; for the computation of $RIE_{20}$, the media comparison engine computes the image similarity scores between frame numbers 20 to 29 of source video_2 and frame numbers 100 to 109 of the final master video; and for the computation of $RIE_{34}$, the media comparison engine computes the image similarity scores between frame numbers 34 to 43 of source video_2 and frame numbers 100 to 109 of the final master video. An example data structure representing the above computed RIE scores is as follows: [(10,0.65), (12,0.51), (20,0.42), (34,0.15)], where each entry of the data structure is read as (frame number, rate of information exchange (RIE) score).

The media comparison engine continues the above process of finding the best match for a target master frame until all the probable final search space indices are spanned and the source frame with the best RIE score is identified 308 as the best matching source frame for the target master frame. An example data structure representing the best matching source frame and the computed scores for the target master frame is as follows: [['video_2.mp4', 10, (1.2, 1.3), 0.65, 0.96],100]], where each entry of the data structure is read as [[source_video_name, best matching frame_number, scale, image_similarity_score, descriptor_match_score], frame_number_in_final_master]]

The media comparison engine follows the above process for all the probable best matching source videos. Thereafter, the media comparison engine identifies 309 the top 3 matching source videos, if applicable, based on the final RIE scores for the source videos and initiates further processing. After the best matched source frames are found in each of the matched source videos for a target master frame, the media comparison engine scans all the subsequent source frames following these best matched source frames for matching based on the computed signatures, until a mismatch occurs. This process of iterating over all the subsequent source frames after the match with the target master frame is found is referred to as a contiguous block matching process. An example data structure output of the contiguous block matching process showing results for 10 contiguous matched frames is disclosed below.

[['video_2.mp4', 10, (1.2, 1.3), 0.65, 0.96],100],
['video_2.mp4', 11, (1.2, 1.3), 0.65, 0.96],101],
['video_2.mp4', 12, (1.2, 1.3), 0.66, 0.96],102],
['video_2.mp4', 13, (1.2, 1.3), 0.66, 0.95],103],
['video_2.mp4', 14, (1.2, 1.3), 0.65, 0.92],104],
['video_2.mp4', 15. (1.2, 1.3), 0.65, 0.96],105],
['video_2.mp4', 16, (1.2, 1.3), 0.67, 0.97],106],
['video_2.mp4', 17, (1.2, 1.3), 0.68, 0.97],107],
['video_2.mp4', 18, (1.2, 1.3), 0.67, 0.95],108],
['video_2.mp4', 19, (1.2, 1.3), 0.65, 0.96],109]]

Further, to match the videos at different frame rates, the media comparison engine computes a frame jump mechanism. During the contiguous matching process, the media comparison engine checks the relative closeness of a given frame in the compared video to the given frame in the source video with respect to time, by assigning the first matching frames in both the videos for the current block as the base time reference. In an example, consider a video of frame rate 29.97 fps is compared with a video of frame rate a 25 fps, the media comparison engine caters to the additional 5 frames. So, when that there is a jump of some frames while matching the frames. The frame number 3,4,5 at 29.97 fps corresponds to a start time value of 67 milliseconds, 100 milliseconds and 133 milliseconds respectively, while frame number 3,4 at 25 fps corresponds to a start time value of 80 and 120 milliseconds. While determining the frame to match, the difference in the time for the frame numbers is checked. Frame number 3 in 29.97 is close to frame number 3 in 25 fps. But frame number 5 in 29.97 is closer to frame number 4 at 25 fps as compared to frame number 4 in 29.97. Hence, matching frame number 4 to frame number 4 in both the videos is skipped, and frame number 4 in 25 to frame number 5 in 29.97 video is matched.

If a target master frame does not find any match 313, the media comparison engine skips a frame rate number of frames and initiates the above-mentioned processes again to find a match. For any given shot in the final master video, the media comparison engine conducts, for example, at most 2 search iterations to find a match. If a match is not found, the media comparison engine skips the remaining master frames in the master shot and embarks on a new master shot for finding a match. The media comparison engine conducts, for example, at most 2 search iterations for a given shot because, for any given target master frame, if the algorithm does not latch onto the exact matching source frame, it may break during the contiguous match making process, and hence, the process needs to be reinitiated again for matching the remaining master frames in the master shot, to the source frames in the previously matched source video(s).

Moreover, since the media comparison engine skips frames during the process of matching, once a match is found and the contiguous block matching process is completed, according to an embodiment, the media comparison engine initiates a backward frame matching routine to determine whether any of the frames before the first frame of the current contiguous matched block can find a match in the same source video. The backward frame matching routine ensures that matching of any frames is not missed out if a match is available. An example data structure output of the backward frame matching routine showing results for 10 contiguous backward matched frames is disclosed below.

[['video_2.mp4', 0, (1.2, 1.3), 0.65, 0.96],90],
['video_2.mp4', 1, (1.2, 1.3), 0.65, 0.96],91],
['video_2.mp4', 2, (1.2, 1.3), 0.66, 0.96],92],
['video_2.mp4', 3, (1,2, 1.3), 0.66, 0.95],93],
['video_2.mp4', 4, (1.2, 1.3), 0.65, 0.92],94],
['video_2.mp4', 5, (1.2, 1.3), 0.65, 0.96],95],
['video_2.mp4', 6, (1.2, 1.3), 0.67, 0.97],96],
['video_2.mp4', 7, (1.2, 1.3), 0.68, 0.97),97],
['video_2.mp4'. 8, (1.2, 1.3), 0.67, 0.95],98],
['video_2.mp4', 9, (1.2, 1.3), 0.65, 0.96],99]]

The media comparison engine repeats the above-mentioned processes until all the shots are iterated and all the possible matches are obtained for the master frames in the final master video to complete the matching process in video conformance. The media comparison engine stores 311 the results of the frame matching process in a data structure, which has the index of all the matching target master frames and the indices of all the source frames matched to the target master frame, along with a confidence score for the match, the name of the source video to which the target master frame is matched, and the scale differences between the matched images. This format of the data structure allows generation of an edit decision list with the required information for downstream media workflows. The media comparison engine initializes 312 the next available target master frame for matching. The media comparison engine performs all the above disclosed steps for executing the matching process for video subtitle retiming and DI validation. For video conformance, the media comparison engine executes all the matching, mapping, and parallelization processes across source frames from multiple source video files, while for subtitle retiming and DI validation, the media comparison engine executes these processes for the source frames within a single source video file.

During the contiguous matching process after the best match for a given compared video frame is found, there is possibility of latching on to a similar frame but not the exact match. This usually happens when there are editorial cuts made to the source video to generate the compared video. Therefore, after all the matches are obtained, all the matched frames are collated to form contiguous matching blocks. The boundaries of these contiguous blocks in the reference video is traversed. In one embodiment, if there is an unmatched block of frames between two contiguous matched blocks in the reference video, a check for course correction is initiated. In this step, the engine checks in an iterative manner if frames in the unmatched block can match a frame in the preceding matched block of the compared video using the mechanism of finding the best match for a given frame. When a match is found, the media comparison engine checks whether the confidence score of the previously matched reference frame is less than the current match. If yes, the media comparison engine checks for contiguous match between subsequent frames in both the compared video and source video. Further, the media comparison engine updates the collated matching block with the new match information for the frames that matched. This process is repeated until there are no instances of match re-alignments.

Additionally, if there are any pending unmatched blocks of frames in the compared video after course correction, an audio matching process is initiated by the media comparison engine to match the un-matched blocks. In this step, the media comparison engine checks in both the videos, if there is an unmatched block of equal duration between two matching blocks in both the compared and reference video. If yes, the audio is extracted for those durations in both the videos, a spectrogram for both the audio segments is generated, followed by a difference hash computation of the individual spectrograms. If the hash difference between the spectrograms is greater than or equal to a predefined value, the segment is qualified as a matched segment and update the collated matching blocks to inculcate the matched frames in both the videos as matching blocks. In one embodiment, the predefined value of the hash difference is 0.9.

Furthermore, the media comparison engine executes the match summarization which uses the output of the match making step to create an edit decision list (EDL) response and populate a data structure (json) with all the relevant information, which is used for visualization of the matched and unmatched block of frames in a user interface.

Figure 4:
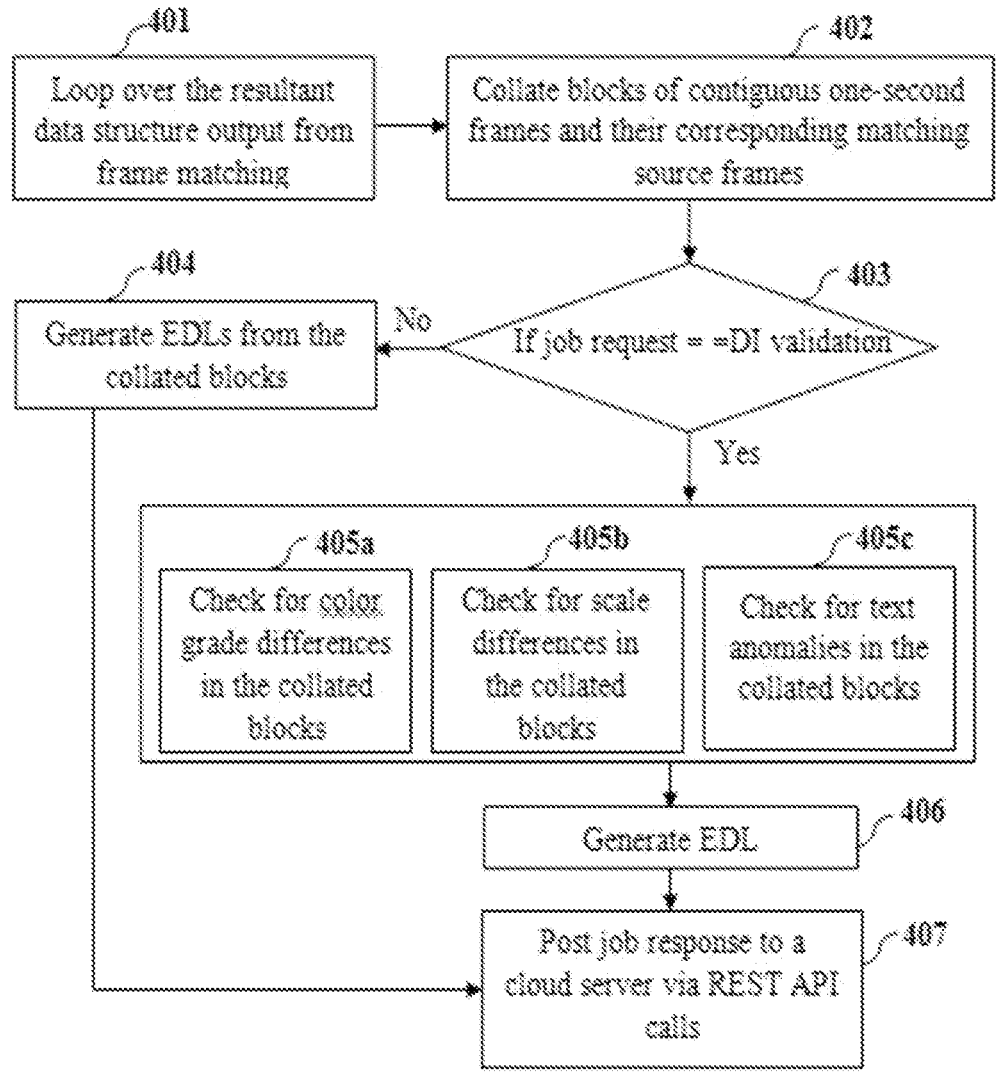
FIG. 4 illustrates a flowchart of a method for executing match summarization, according to one embodiment herein.

FIG. 4 illustrates a flowchart of a method for executing match summarization, according to one embodiment herein. The media comparison engine executes a match summarization process by looping 401 the output of the frame matching process, that is, the data structure comprising the index of all the matching target master frames and the indices of all the source frames matched to the target master frame, along with a confidence score for the match, the name of the source video to which the target master frame is matched, and the scale differences between the matched images, to generate an edit decision list (EDL) response and populate a data structure, for example, in a JavaScript Object Notation (JSON) format with the information required for visualization of the matched and unmatched block of frames on a user interface. The media comparison engine parses the data structure populated during the frame matching process disclosed in the detailed description of FIGS. 3A-3B and combines or collates 402 all the target master frames and the source frames to create blocks of contiguous frames. The media comparison engine qualifies a minimum frame rate number of contiguous matching frames as a block.

For a video conformance workflow, the media comparison engine generates 404 a total of m+2 EDL files, where "m" is the total number of unique matched source video files, one EDL file comprises all the matched and unmatched blocks in the final master video and the corresponding best source video file block matches, and the other one EDL file comprises all the unmatched blocks of the final master video. An example EDL comprising all the matched and unmatched blocks in the final master video is disclosed below.

TITLE: Final_Master.mp4 (EDL to reconstruct the Edit Master with the best Source Matches.)
FCM: NON-DROP FRAME
001 AX V C 00:00:06:19 00:00:23:24 00:00:00:00 00:00:17:05
FROM CLIP NAME: source_1.mov
COMMENT: M1(Matched)
002 AX V C 00:00:24:06 00:00:25:20 00:00:17:05 00:00:18:19
FROM CLIP NAME: source_2.mov
COMMENT: M2(Matched)
003 AX V C 00:00:51:24 00:00:53:19 00:00:18:19 00:00:20:14
FROM CLIP NAME: source_4.mov
COMMENT: M3(Matched)
004 AX V C 00:00:29:21 00:00:31:19 00:00:20:14 00:00:22:12

FROM CLIP NAME: source_2.mov
COMMENT: M4(Matched)
005 AX V C 00:00:28:06 00:00:29:12 00:00:22:12 00:00:23:18
FROM CLIP NAME: source_3.mov
COMMENT: M5(Matched)
006 AX. V C 00:00:34:08 00:00:38:03 00:00:23:18 00:00:27:13
FROM CLIP NAME: source_2.mov
COMMENT: M6(Matched)
V C 00:01:01:05 00:01:04:04 00:00:27:13 00:00:30:12
007 AX
FROM CLIP NAME: source_4.mov
COMMENT: M7(Matched)
008 AX V C 00:00:42:13 00:00:44:10 00:00:30:12 00:00:32:09
FROM CLIP NAME: source_2.mov
COMMENT: M8(Matched)
009 AX V C 00:00:32:09 00:00:42:00 00:00:32:09 00:00:42:00
FROM CLIP NAME: unknown_source.mp4
COMMENT: Y1(Un-Matched)

For a video subtitle retiming workflow, the media comparison engine generates 404 a single EDL file comprising information about the matched blocks of the final master video comprising edits and the unmatched blocks of the final master video comprising inserts. An example representation of an EDL for video subtitle retiming is disclosed below.

TITLE: Final Master Video
FCM: NON-DROP FRAME
001 AX C 00:00:00:00 00:00:21:01 00:00:00:00 00:00:21:01
FROM CLIP NAME: source_master.mp4
COMMENT: M1(Edit/Matched)
002 AX V C 00:00:31:15 00:01:31:11 00:00:21:01 00:01:20:21
FROM CLIP NAME: source_master.mp4
COMMENT: M2(Edit/Matched)
003 AX V C 00:01:54:04 00:02:24:08 00:01:20:21 00:01:51:10
FROM CLIP NAME: source_master.mp4
COMMENT: M3(Edit/Matched)
004 AX V C 00:02:54:06 00:03:03:09 00:01:51:10 00:02:00:13
FROM CLIP NAME: source_master.mp4
COMMENT: M4(Edit/Matched)
005 AX V C 00:02:00:13 00:02:07:02 00:02:00:13 00:02:07:02
FROM CLIP NAME: edit_master.mp4
COMMENT: Y1(Insert/Un-Matched)

In a digital intermediary (DI) validation workflow 403, the media comparison engine generates a final EDL comprising additional information, for example, text differences or anomalies 405c, color grade differences 405a, and scale differences 405b as metadata. The media comparison engine extracts the additional information from the matching blocks. The media comparison engine identifies the difference in color grades using the LAB color space information. The media comparison engine iterates over each of the matched blocks and computes a relative color difference between a source frame and the compared master frame. If the average value of the difference between any one of the LAB channels in a block of contiguous one-second frames is greater than a value of, for example, 2% of 255=5, the media comparison engine considers the block to have a color grade difference. Similarly, for checking scale differences, the media comparison engine initially computes the ratio of resolution differences between the reference and compared frames, as the difference in resolution should not be considered as a scale change. Once the base scale is computed, if a contiguous block of matching frames exhibits scale differences above the base scale values, the media comparison engine considers those blocks of frames to have varying scales, that is, zoom-ins and zoom-outs. For identifying text differences, the media comparison engine checks for the presence or absence of text in a pair of matching blocks of frames. If text is present in a contiguous block of one-second frames and text is absent in its corresponding matched block, the media comparison engine flags and identifies the difference as a text anomaly. Moreover, if text is present in both the matched block of frames, according to an embodiment, the media comparison engine performs optical character recognition (OCR) for extracting the corresponding texts and their coordinates. Thereafter, the media comparison engine performs a check for identifying spelling differences and scale differences for matching text pairs. If there is a difference, the media comparison engine flags the matching text pairs as pairs with text anomalies. When all the video attribute differences are identified, the media comparison engine generates 406 an EDL containing the video attribute differences as metadata information. An example representation of an EDL for DI validation showing matched, moved and un-matched segments is disclosed below.

TITLE: Final Master
FCM: NON-DROP FRAME
001 AX V C 00:00:00:00 00:00:10:00 00:00:00:00 00:00:10:00
FROM CLIP NAME: video_2.mp4
COMMENT: M1(Matched)
002 AX V C 00:00:35:00 00:01:00:00 00:00:10:00 00:00:35:00
FROM CLIP NAME: video_2.mp4
COMMENT: M2(Matched But Moved) 003 AX V C 00:00:35:00 00:00:50:00 00:00:35:00 00:00:50:00
FROM CLIP NAME: video_1.mp4
COMMENT: Y1(Un-Matched)
004 AX V C 00:00:10:00 00:00:20:00 00:00:50:00 00:01:00:00
FROM CLIP NAME: video_2.mp4
COMMENT: M4(Matched But Moved)

Another example representation of an EDL for DI validation showing segments with scale differences is disclosed below.
001 AX V C 00:00:05:00 00:00:10:00 00:00:05:00 00:00:10:00
FROM CLIP NAME: video_2.mp4
COMMENT: zh: 1.1, zv: 1.1, M1 Z1
002 AX V C 00:00:10:00 00:00:20:00 00:00:50:00 00:01:00:00
FROM CLIP NAME: video_2.mp4
COMMENT: zh: 1.2, zv: 1.1, M4 Z1

Another example representation of an EDL for DI validation showing segments with color differences is disclosed below:
001 AX V C 00:00:05:00 00:00:10:00 00:00:05:00 00:00:10:00
FROM CLIP NAME: video_2.mp4
COMMENT: M1 C1

Another example representation of an EDL for DI validation showing segments with text differences is disclosed below:
001 AX V C 00:00:05:00 00:00:10:00 00:00:05:00 00:00:10:00
FROM CLIP NAME: video_2.mp4

COMMENT: M1 T1
002 AX V C 00:00:10:00 00:00:20:00 00:00:50:00 00:01:00:00
FROM CLIP NAME: video_2.mp4
COMMENT: M4 T1

After generating 404 and 406 EDLs for the downstream media workflows, for example, video conformance, video subtitle retiming, and DI validation, according to an embodiment, the media comparison engine posts 407 a job response to a cloud server, for example, via representational state transfer (REST) application programming interface (API) calls.

Figure 5:
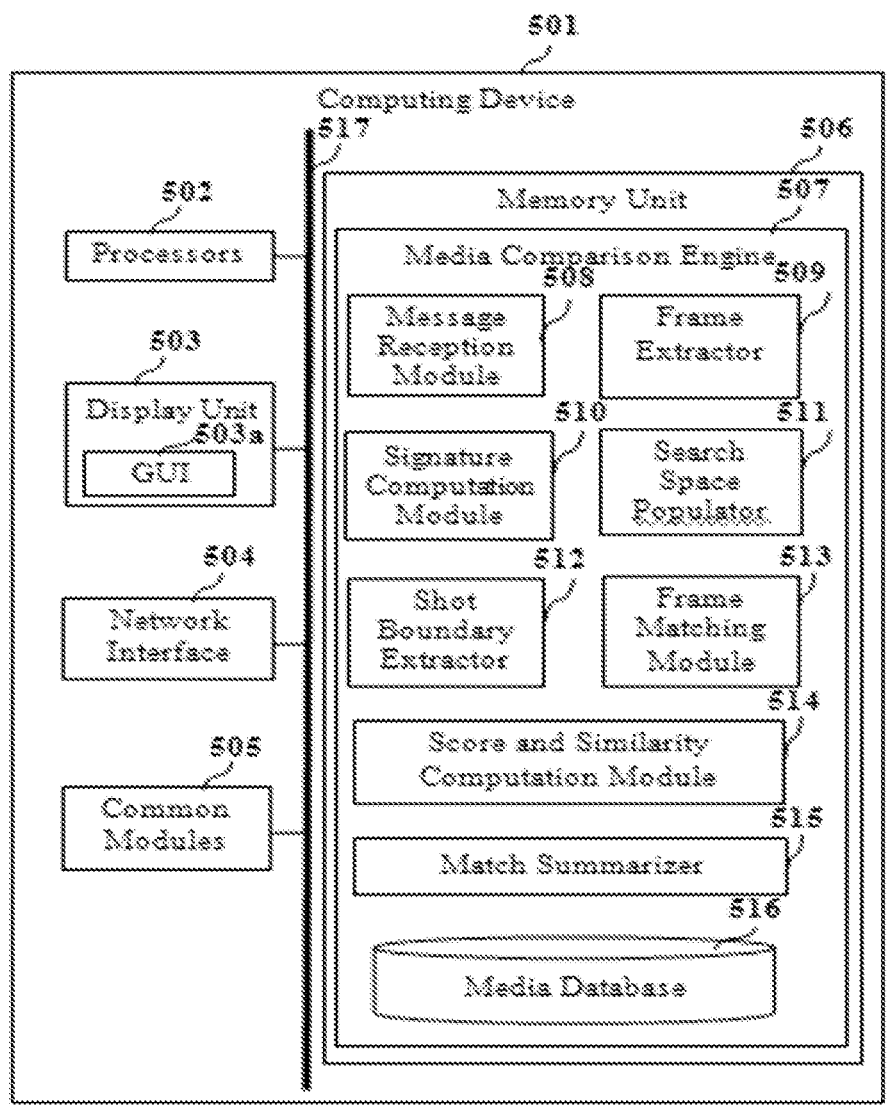
FIG. 5 illustrates an architectural block diagram of an exemplary implementation of a system comprising a media comparison engine for determining matches between frames in media assets for automating downstream media workflows using artificial intelligence, according to one embodiment herein.

FIG. 5 illustrates an architectural block diagram of an exemplary implementation of a system comprising the media comparison engine 507 for determining matches between frames in media assets for automating downstream media workflows using artificial intelligence, according to one embodiment herein. According to an embodiment, the media comparison engine 507 is deployed in a computing device 501 as illustrated in FIG. 5. The computing device 501 is a computer system programmable using high-level computer programming languages. The computing device 501 is an electronic device, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a workstation, a client device, a server, a portable electronic device, a network enabled computing device, an interactive network enabled communication device, an image capture device, any other suitable computing equipment, combinations of multiple pieces of computing equipment, etc. According to an embodiment, the media comparison engine 507 is implemented in the computing device 501 using programmed and purposeful hardware. According to an embodiment, the media comparison engine 507 is a computer-embeddable system that determines matches between frames in media assets for automating downstream media workflows using artificial intelligence.

The media comparison engine 507 in the computing device 501 communicates with a distributed streaming platform such as the Apache Kafka® platform for receiving messages comprising media assets via a network, for example, a short-range network or a long-range network. The network is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In another embodiment, the media comparison engine 507 is implemented in a cloud computing environment as disclosed in the detailed description of FIG. 6 and FIGS. 7A-7C. As used herein, "cloud computing environment" refers to a processing environment comprising configurable computing physical and logical resources, for example, networks, servers, storage media, virtual machines, applications, services, etc., and data distributed over the network. The cloud computing environment provides an on-demand network access to a shared pool of the configurable computing physical and logical resources. According to an embodiment, the media comparison engine 507 is a cloud computing-based platform implemented as a service for determining matches between frames in media assets for automating downstream media workflows using artificial intelligence. In another embodiment, the media comparison engine 507 is implemented as an on-premise platform comprising on-premise software installed and run on client systems on the premises of an organization.

As illustrated in FIG. 5, the computing device 501 comprises a non-transitory, computer-readable storage medium, for example, a memory unit 506 for storing computer program instructions defined by modules, for example, 508, 509, 510, 511, 512, 513, 514, 515, etc., of the media comparison engine 507. As used herein, "non-transitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The computing device 501 further comprises multiple processors 502 operably and communicatively coupled to the memory unit 506 for executing the computer program instructions defined by the modules, for example, 508, 509, 510, 511, 512, 513, 514, 515, etc., of the media comparison engine 507 for determining matches between frames in media assets for automating downstream media workflows using artificial intelligence. The memory unit 506 is used for storing program instructions, applications, and data. According to an embodiment, the memory unit 506 is a random-access memory (RAM) or another type of dynamic storage device that stores information and instructions for execution by the processors 502. The memory unit 506 also stores temporary variables and other intermediate information used during execution of the instructions by the processors 502. According to an embodiment, the computing device 501 further comprises a read only memory (ROM) or other types of static storage devices that store static information and instructions for execution by the processors 502. According to an embodiment, the modules, for example, 508, 509, 510, 511, 512, 513, 514, 515, etc., of the media comparison engine 507 are stored in the memory unit 506.

The modules, for example, 508, 509, 510, 511, 512, 513, 514, 515, etc., of the media comparison engine 507, when loaded into the memory unit 506 and executed by the processors 502, transform the computing device 501 into a specially-programmed, special purpose computing device configured to implement the functionality disclosed herein. The processors 502 refer to microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. According to an embodiment, each of the processors 502 is implemented as a processor set comprising, for example, a programmed microprocessor and a math or graphies co-processor. The media comparison engine 507 is not limited to employing the processors 502. According to an embodiment, the media comparison engine 507 employs controllers or microcontrollers. The processors 502 execute the modules, for example, 508, 509, 510, 511, 512, 513, 514, 515, etc., of the media comparison engine 507.

As illustrated in FIG. 5, the computing device 501 further comprises a data bus 517, a display unit 503, a network interface 504, and common modules 505. The data bus 517 permits communications between the modules, for example, 502, 503, 504, 505, and 506 of the computing device 501. The display unit 503, via a graphical user interface (GUI) 503a, displays information, images, videos, display interfaces, user interface elements such as checkboxes, input text fields, filters, etc., for example, for allowing a user to visualize results of downstream media workflows comprising workflows for video conformance, video subtitle retiming, and digital intermediary (DI) validation; view real-time changes while any video segment or video is selected or played; export and view reports and edit decision lists (EDLs), etc., as disclosed in the detailed descriptions of FIGS. 1A-1B, FIGS. 8A-8D, and FIGS. 9-15. According to an embodiment, the media comparison engine 507 renders the GUI 503a on the display unit 503 for receiving inputs from the user. The GUI 503a comprises, for example, an online web interface, a web-based downloadable application interface, a mobile-based downloadable application interface, etc.

The network interface 504 enables connection of the computing device 501 to the network. According to an embodiment, the network interface 504 is provided as an interface card also referred to as a line card. The network interface 504 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 505 of the computing device 501 comprise, for example, input/output (I/O) controllers, input devices, output devices, fixed media drives such as hard drives, removable media drives for receiving removable media, etc. Computer applications and programs are used for operating the computing device 501. The programs are loaded onto fixed media drives and into the memory unit 506 via the removable media drives. According to an embodiment, the computer applications and programs are loaded into the memory unit 506 directly via the network.

According to an exemplary implementation illustrated in FIG. 5, the media comparison engine 507 comprises a message reception module 508, a frame extractor 509, a signature computation module 510, a search space populator 511, a shot boundary extractor 512, a frame matching module 513, a score and similarity computation module 514, a match summarizer 515, and optionally a media database 516, stored in the memory unit 506 and executed by the processors 502 in the computing device 501. The message reception module 508 receives a message comprising multiple media assets for one or more of the downstream media workflows and stores the media assets in the media database 516. The frame extractor 509 extracts source frames constituting each of multiple source shots from each source media asset and extracts master frames constituting each of multiple master shots from the master media asset.

The signature computation module 510 computes multiple signatures for each of the extracted source frames and each of the extracted master frames in a time domain as disclosed in the detailed description of FIGS. 1A-1B and FIG. 2. According to an embodiment, the signature computation module 510 determines performance of gamma correction on each of the extracted source frames and each of the extracted master frames prior to the computation of the frame interest points. The search space populator 511 determines an optimal search space for scanning each of the extracted source frames of each source media asset as disclosed in the detailed description of FIG. 2.

The shot boundary extractor 512 computes boundaries of the master shots of the master media asset. According to an embodiment, the shot boundary extractor 512 computes the boundaries of the master shots of the master media asset by matching color histograms of adjacent master frames of each of the master shots. According to an embodiment, the shot boundary extractor 512 corrects the boundaries of the master shots of the master media asset using physical segments of the master media asset.

For a target master frame among the extracted master frames in each of the computed boundaries of the master shots, the frame matching module 513 performs a comparison with each of the extracted source frames of each source media asset in the optimal search space using the computed signatures and determines matches of the extracted source frames with the target master frame in the optimal search space. The search space populator 511, in communication with the frame matching module 513, computes a final search space by mapping all the determined matches of the extracted source frames in the optimal search space to their corresponding time elements, for example, seconds, and including source frames of the corresponding time elements in the final search space. The score and similarity computation module 514, in communication with the frame matching module 513, computes a rate of information exchange (RIE) score for each of the determined matches based on one or more of the signatures and similarity scores computed for each of the source frames of each source media asset in the final search space. The frame matching module 513 identifies a best match of one of the source frames of one of the source media assets to the target master frame of the master media asset based on the RIE score of each of the determined matches; and performs a comparison of the source frames subsequent to the best matching source frame of that source media asset with the master frames subsequent to the target master frame of the master media asset and determines matches of the subsequent source frames with the subsequent master frames of the master media asset. The frame matching module 513 executes a course correction mechanism for latching on to the exact matching source frame.

The score and similarity computation module 514, in communication with the frame matching module 513, computes the RIE score for identifying matching frames as disclosed in the detailed description of FIGS. 3A-3B, where a rate of change between adjacent source frames over a predefined duration of time is accumulated to determine the best possible match for a target master frame. According to an embodiment, the frame matching module 513 identifies the best match of one of the source frames of the source media asset to the target master frame of the master media asset as follows: The frame matching module 513 determines probable time elements, for example, probable seconds, comprising potential source frames from among the source frames of each source media asset that are a match for the target master frame of the master media asset by creating a corpus of source frames sampled at a fixed sampling rate. The frame matching module 513 identifies matches from among the potential source frames in the probable time elements. The frame matching module 513 maps the identified matches of the potential source frames to their corresponding time elements and generates a final corpus of probable matches of the source frames. The frame matching module 513 then identifies the best match of one of the source frames to the target master frame from among the final corpus of the probable matches of the source frames based on the RIE score.

According to one embodiment herein, the frame matching module 513 executes a backward frame matching routine to determine whether any of the master frames before the target master frame finds a match in a same one of the source media assets. Also, the frame matching module 513 compares videos at different frame rates. In one embodiment, when the videos are created for different geographies, the frame rate of the videos may be different. The frame matching module 513 executes a frame jump mechanism which finds the closeness between two frames in time and assumes them to be a manifestation of each other, for asserting a match. This works in principle because of the fact that the frames packed within a second are a manifestation in either of the videos.

According to one embodiment herein, the match summarizer 515 generates a match summary list based on the downstream media workflows as disclosed in the detailed description of FIG. 4. The match summary list comprises, for example, an index of matching master frames of the master media asset, indices of the source frames of the source media assets matched to the target master frame of the master media asset, a confidence score of the identified best match, scale differences between the determined best matches, and associated metadata based on the downstream media workflows.

The media database 516 is any storage area or medium that can be used for storing data and media assets. According to an embodiment, the media database 516 is any of a structured query language (SQL) database or a not only SQL (NoSQL) database. According to an embodiment, the media database 516 is a location on a file system. In another embodiment, the media database 516 is configured to be remotely accessible by the media comparison engine 507 in the computing device 501 via the network. According to an embodiment, the media database 516 is configured as a cloud-based database implemented in a cloud computing environment.

The processors 502 retrieve instructions defined by the message reception module 508, the frame extractor 509, the signature computation module 510, the search space populator 511, the shot boundary extractor 512, the frame matching module 513, the score and similarity computation module 514, and the match summarizer 515 from the memory unit 506 for performing respective functions disclosed above. The message reception module 508, the frame extractor 509, the signature computation module 510, the search space populator 511, the shot boundary extractor 512, the frame matching module 513, the score and similarity computation module 514, and the match summarizer SIS of the media comparison engine 507 are disclosed above as software executed by the processors 502. According to an embodiment, the modules, for example, 508, 509, 510, 511, 512, 513, 514, 515, etc., of the media comparison engine 507 are implemented completely in hardware. In another embodiment, the modules, for example, 508, 509, 510, 511, 512, 513, 514, 515, etc., of the media comparison engine 507 are implemented by logic circuits to carry out their respective functions disclosed above. According to an embodiment, the media comparison engine 507 is also implemented as a combination of hardware and software and one or more processors, for example, 502, that are used to implement the modules, for example, 508, 509, 510, 511, 512, 513, 514, 515, etc., of the media comparison engine 507.

For purposes of illustration, the detailed description refers to the modules, for example, 508, 509, 510, 511, 512, 513, 514, 515, 516, etc., of the media comparison engine 507 being run locally on a single computing device 501; however the scope of the system and the method disclosed herein is not limited to the modules, for example, 508, 509, 510, 511, 512, 513, 514, 515, 516, etc., of the media comparison engine 507 being run locally on a single computing device 501 via the operating system and the processors 502, but may be extended to run remotely over a network by employing a web browser and a remote server, a mobile phone, or other electronic devices. According to an embodiment, one or more portions of the system disclosed herein are distributed across one or more computer systems (not shown) coupled to the network.

The non-transitory, computer-readable storage medium disclosed herein stores computer program instructions executable by the processors 502 for determining matches between frames in media assets for automating downstream media workflows using artificial intelligence. The computer program instructions implement the processes of various embodiments disclosed above and perform additional steps that may be required and contemplated for determining matches between frames in media assets for automating downstream media workflows using artificial intelligence. When the computer program instructions are executed by the processors 502, the computer program instructions cause the processors 502 to perform the steps of the method disclosed in the detailed descriptions of FIGS. 1A-4. According to an embodiment, a single piece of computer program code comprising computer program instructions performs one or more steps of the method disclosed in the detailed descriptions of FIGS. 1A-4. The processors 502 retrieve these computer program instructions and executes them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller. Therefore, references to a module, or an engine, or a unit, according to an embodiment, refer to the hardware that is specifically configured to recognize and/or execute the computer program codes to be held on a non-transitory, computer-readable storage medium. According to an embodiment, the computer program codes comprising computer readable and executable instructions are implemented in any programming language, for example, Python®. In another embodiment, other object-oriented, functional, scripting, and/or logical programming languages are also used. According to an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

Figure 6:
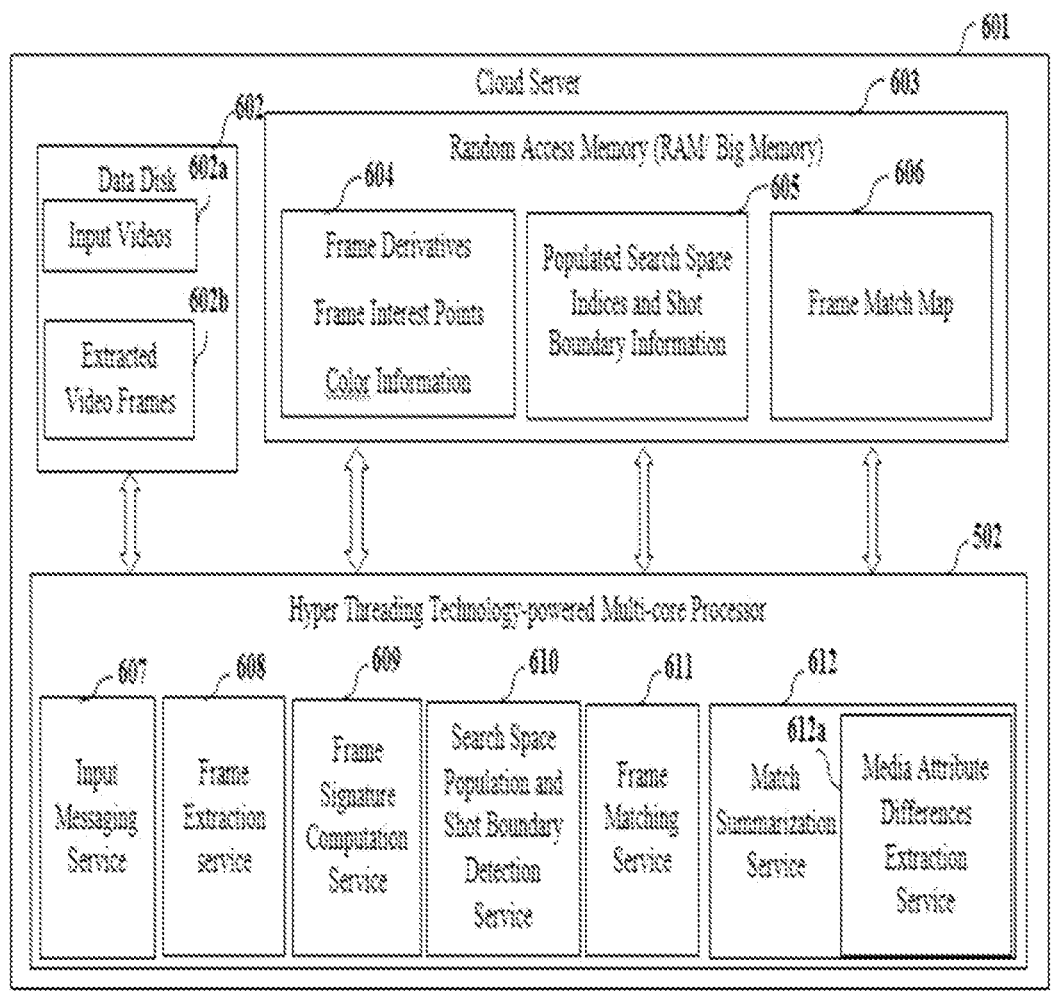
FIG. 6 illustrates an architectural block diagram of an exemplary implementation of the system for determining matches between frames in media assets for automating downstream media workflows using artificial intelligence in a cloud computing environment, according to one embodiment herein.

FIG. 6 illustrates an architectural block diagram of an exemplary implementation of the system for determining matches between frames in media assets for automating downstream media workflows using artificial intelligence in a cloud computing environment, according to one embodiment herein. According to an embodiment, the system disclosed herein is implemented in a cloud computing environment comprising a cloud server 601. As downstream media workflows, for example, workflows of video conformance, subtitle retiming, and digital intermediary (DI) validation are resource, memory, and compute intensive, a hyper threading technology-powered, multicore, big memory, large data disk-enabled, high performance cloud server 601 is utilized in the system disclosed herein. The cloud server 601 comprises a data storage device, for example, a data disk 602 of more than 200 gigabytes (GB) storage capacity for storing input media assets, for example, videos 602a, and extracted video frames 602b. The cloud server 601 further comprises a memory unit, for example, a random-access memory (RAM) or a big memory device 603 of about 64 GB memory for storing frame signatures 604, for example, frame derivatives, frame interest points, and color information; populated search space indices and shot boundary information 605; and a frame match map 606 generated by the media comparison engine of the system disclosed herein.

According to one embodiment herein, the processors 502 configured to execute various functional services of the media comparison engine comprise a hyper threading technology-powered multi-core processor. The functional services comprise, for example, an input messaging service 607, a frame extraction service 608, a frame signature computation service 609, a search space population and shot boundary detection service 610, a frame matching service 611, and a match summarization service 612 including a media workflow-dependent media attribute differences extraction service 612a for automating the downstream media workflows. The functional services 607, 608, 609, 610, 611, 612, and 612a are implemented by the message reception module 508, the frame extractor 509, the signature computation module 510, the search space populator 511 and the shot boundary extractor 512, the frame matching module 513, the match summarizer 515, and a media attributes difference extractor of the media comparison engine 507 respectively as disclosed in the detailed description of FIG. 5. In this embodiment, the media comparison engine is hosted on a cloud, thereby allowing horizontal and vertical scaling depending on the workload.

Figure 7A:
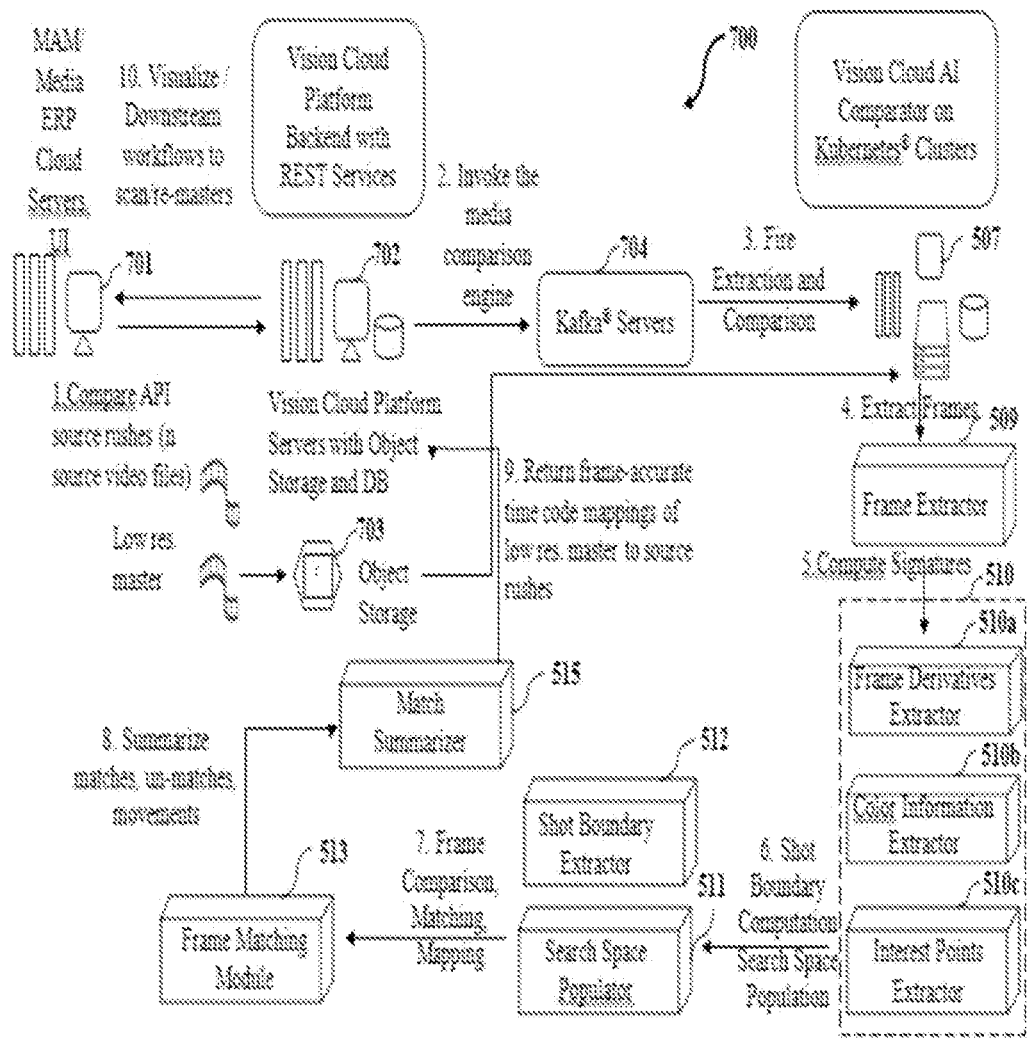
FIG. 7A illustrates a functional block diagram of an exemplary implementation of the system for determining matches between frames in media assets for automating a downstream media conformance workflow using artificial intelligence, according to one embodiment herein.

FIG. 7A illustrates a functional block diagram of an exemplary implementation of the system 700 for determining matches between frames in media assets, for example, videos, for automating a downstream media conformance workflow using artificial intelligence (AI), according to one embodiment herein. In this exemplarily implementation, the system 700 disclosed herein comprises a consortium 701 of media asset management (MAM) systems, enterprise resource planning (ERP) cloud servers and associated user interfaces, vision cloud platform servers 702 with object storage 703 and databases, Kafka® servers 704, and the media comparison engine 507. According to an embodiment, the media comparison engine 507 is implemented as a vision cloud AI comparator operating, for example, on Kubernetes® clusters. In a video conformance workflow as exemplarily illustrated in FIG. 7A, one final master video file, for example, a low resolution master, is compared with "n" source video files or source rushes for determining matches between frames in videos, where "n" is, for example, about 50 to 100. The videos are typically uploaded to the cloud and a request for invoking the video conformance workflow is received by the media comparison engine 507 through a messaging service, for example, a Kafka® messaging service executed by the Kafka® servers 704. The media comparison engine 507 is invoked on a vision cloud, that is, a consortium of AI-powered services hosted on cloud servers.

On receiving the request, the media comparison engine 507 downloads the videos and initiates a frame extraction and comparison as follows. The frame extractor 509 of the media comparison engine 507 extracts all the frames from the various videos. For each of the extracted frames, the signature computation module 510 of the media comparison engine 507 computes various signatures that are scale and illumination invariant in a time domain over scale and space. According to an embodiment, the signature computation module 510 comprises a frame derivatives extractor 510a, a color information extractor 510b, and an interest points extractor 510c for computing signatures, for example, frame derivatives, color information, and frame interest points, respectively. The search space populator 511 of the media comparison engine 507 performs search space population as disclosed in the detailed description of FIG. 2. For a comparison or conformance of "p" frames from a corpus of "m" frames, where m>>p for conformance or m~p for comparison, the media comparison engine 507 selects "k" samples from the "p" frames that are the best representations of the second based on their relative similarity and position which depends on the video frame rate, which totals n*k samples assuming a total of "n" available seconds in the corpus. The shot boundary extractor 512 of the media comparison engine 507 computes the shot boundaries for these "p" frames.

For the first frame of each shot, the frame matching module 513 of the media comparison engine 507 scans all n*k samples to find the most similar match for obtaining the most likely seconds where the frame of interest can be found. For each of the available candidate seconds, the frame matching module 513 identifies the best match by analyzing the combination of the rate of change over consequent frames depending on the length of the shot, the color information, and the frame interest points. When the best match for a target master frame is identified, the frame matching module 513 iterates over the subsequent frames to find additional matches. The frame matching module 513 repeats the frame matching process for each of the shots until all of the available "p" number of frames are compared or have been conformed. The match summarizer 515 of the of the media comparison engine 507 performs a summarization of the entire process, which maps various frames in a shot to the best matches in the available corpus along with additional metadata such as presence of color differences and scale changes. When the summarization is complete, the match summarizer 515 returns frame-accurate time code mappings of the low resolution master to the source rushes and persists the output data comprising output edit decision lists (EDLs) to a database on the vision cloud platform servers 702. A time code encodes each frame with the hour, minute, second, and frame corresponding to the position of the frame relative to the beginning of the video file. Example data structures representing frame-accurate time code mappings of the low-resolution master to source rushes are disclosed below, where source_1.mov, source_2.mov and source_3.mov are the source rushes.

(1) 00:00:06:19 00:00:23:24 00:00:00:00 00:00:17:05
FROM CLIP NAME: source_1.mov
(2) 00:00:24:06 00:00:25:20 00:00:17:05 00:00:18:19
FROM CLIP NAME: source_2.mov
(3) 00:00:51:24 00:00:53:19 00:00:18:19 00:00:20:14
FROM CLIP NAME: source_3.mov
(4) 00:00:29:21 00:00:31:19 00:00:20:14 00:00:22:12
FROM CLIP NAME: source_1.mov The system 700 disclosed herein provides application programming interfaces (APIs) to return the catalogued data via representational state transfer (REST) APIs. That is, the EDLs responses are delivered as an output via REST API calls. According to an embodiment, the catalogued data is displayed on a graphical user interface for real-time visualization.

Figure 7B:
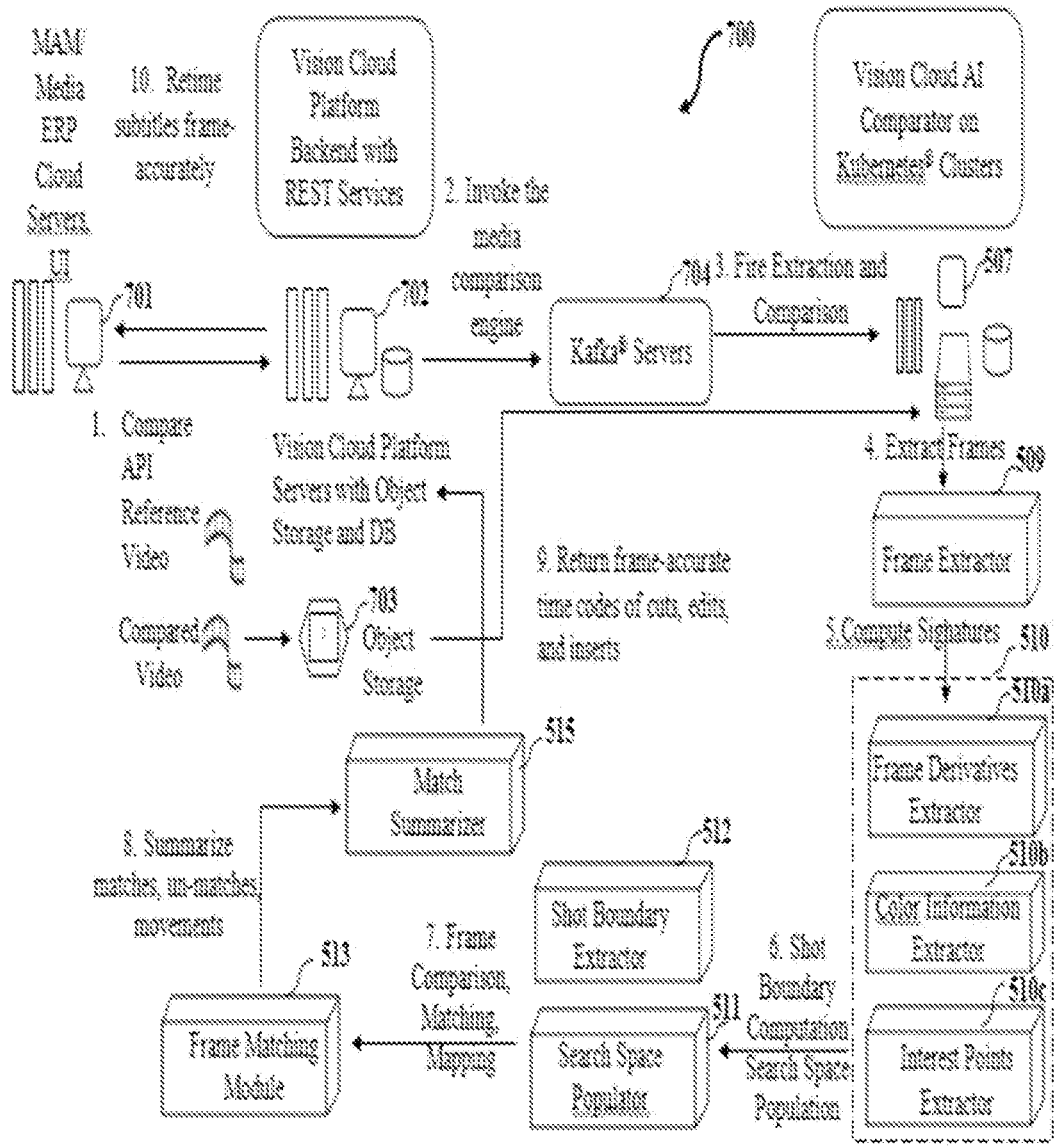
FIG. 7B illustrates a functional block diagram of an exemplary implementation of the system for determining matches between frames in media assets for automating a downstream media subtitle retiming workflow using artificial intelligence, according to one embodiment herein.

FIG. 7B illustrates a functional block diagram of an exemplary implementation of the system 700 for determining matches between frames in media assets, for example, videos, for automating a downstream media subtitle retiming workflow using artificial intelligence, according to one embodiment herein. In a video subtitle retiming workflow as illustrated in FIG. 7B, one final master video file is compared to one source video file. On receiving a request for invoking the video subtitle retiming workflow through a messaging service, for example, a Kafka® messaging service executed by the Kafka® servers 704, the media comparison engine 507 is invoked for executing various functions, for example, frame extraction, signature computation, search space population, shot boundary detection, frame matching, and match summarization using the frame extractor 509, the signature computation module 510, the search space populator 511, the shot boundary extractor 512, the frame matching module 513, and the match summarizer 515 respectively as disclosed in the detailed description of FIG. 5, depending upon the process requirements to generate an output edit decision list (EDL) response. When the summarization is complete, the match summarizer 515 returns frame-accurate time codes of cuts, edits, inserts, and moves, and persists the output data comprising output EDLs to a database on the vision cloud platform servers 702. The cuts refer to removal of some segments from the source video. The inserts refer to addition of new content to the edited version of the source video. The moves refer to scrambling the content of the source video file in a desired timeline in the edited version of the source video. The EDLs responses are delivered as an output via representational state transfer (REST) application programming interface (API) calls. The EDLs are used for retiming the subtitles of the source video files to create a new file with subtitles for the edited version. The frame-accurate time codes in the EDLs allow retiming of subtitles frame-accurately. Example data structures representing frame-accurate time codes of cuts, edits, and inserts are disclosed below, where the comparison is performed between video_1.mp4 and video_2.mp4.

Figure 7C:
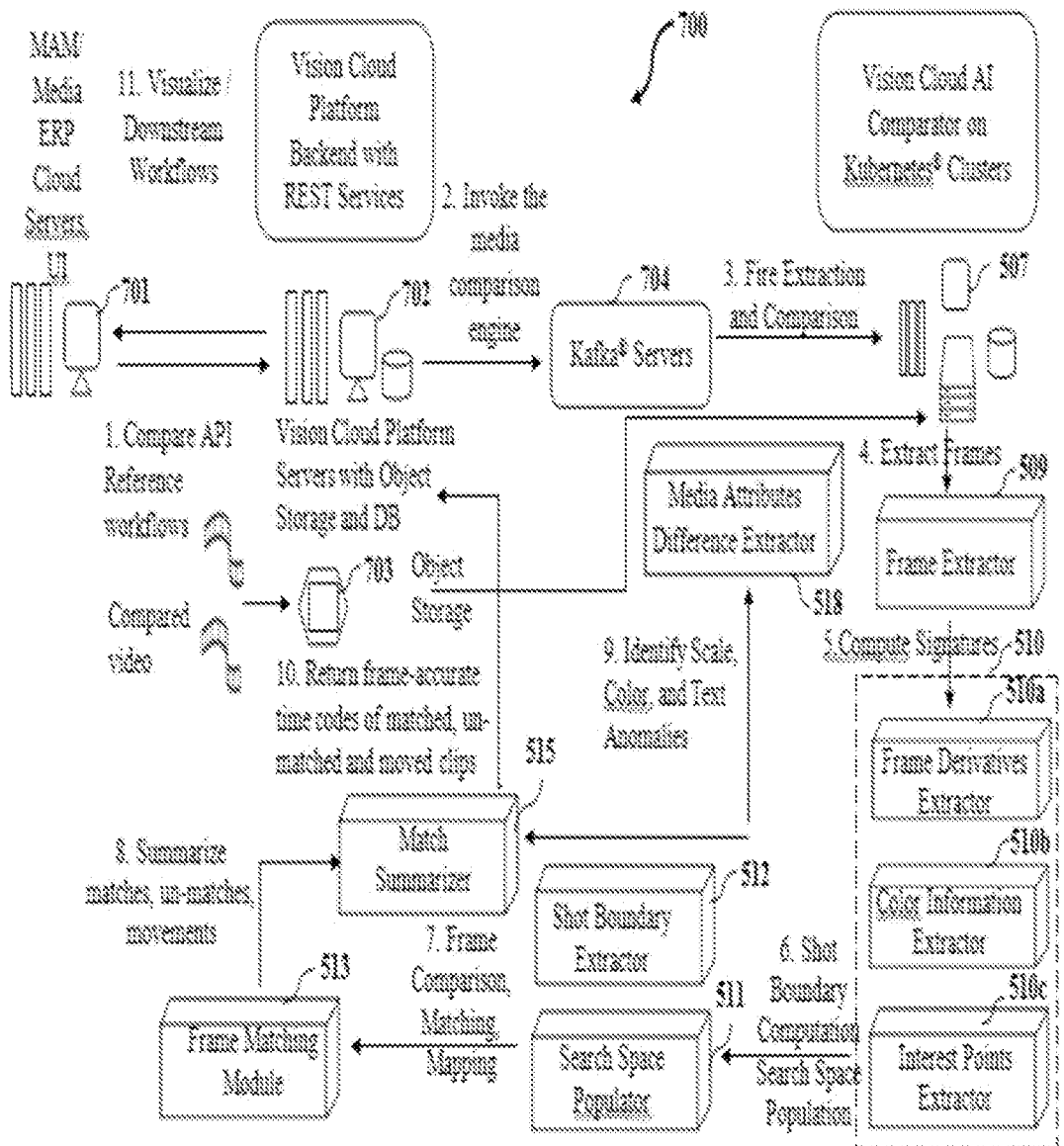
FIG. 7C illustrates a functional block diagram of an exemplary implementation of the system for determining matches between frames in media assets for automating a downstream digital intermediary (DI) validation workflow using artificial intelligence, according to one embodiment herein.
Figure 8A:
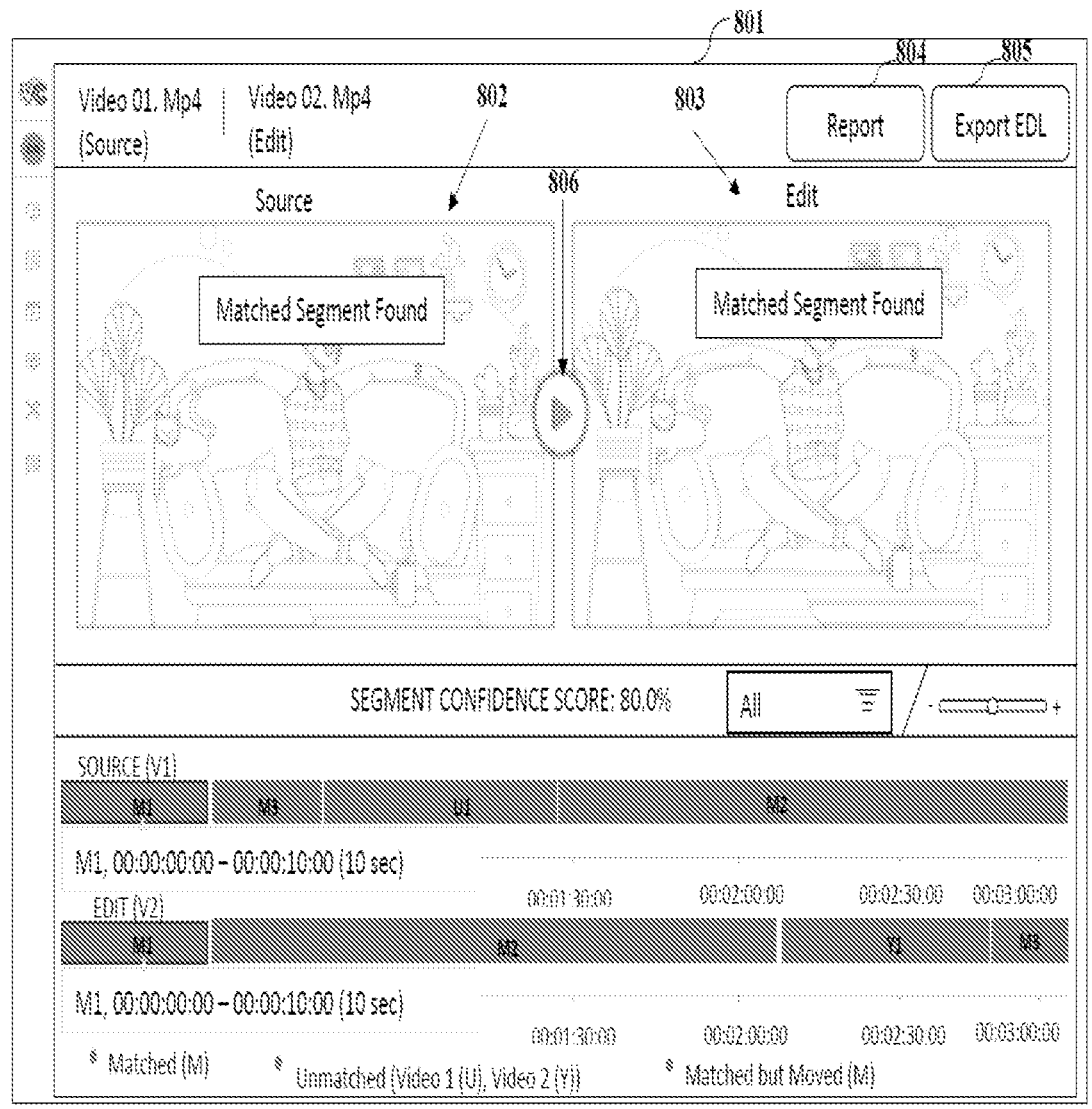
FIGS. 8A-8D exemplarily illustrate screenshots of graphical user interfaces rendered by the media comparison engine, showing matched, unmatched, and moved segments of media assets for DI validation, according to one embodiment herein.
Figure 8B:
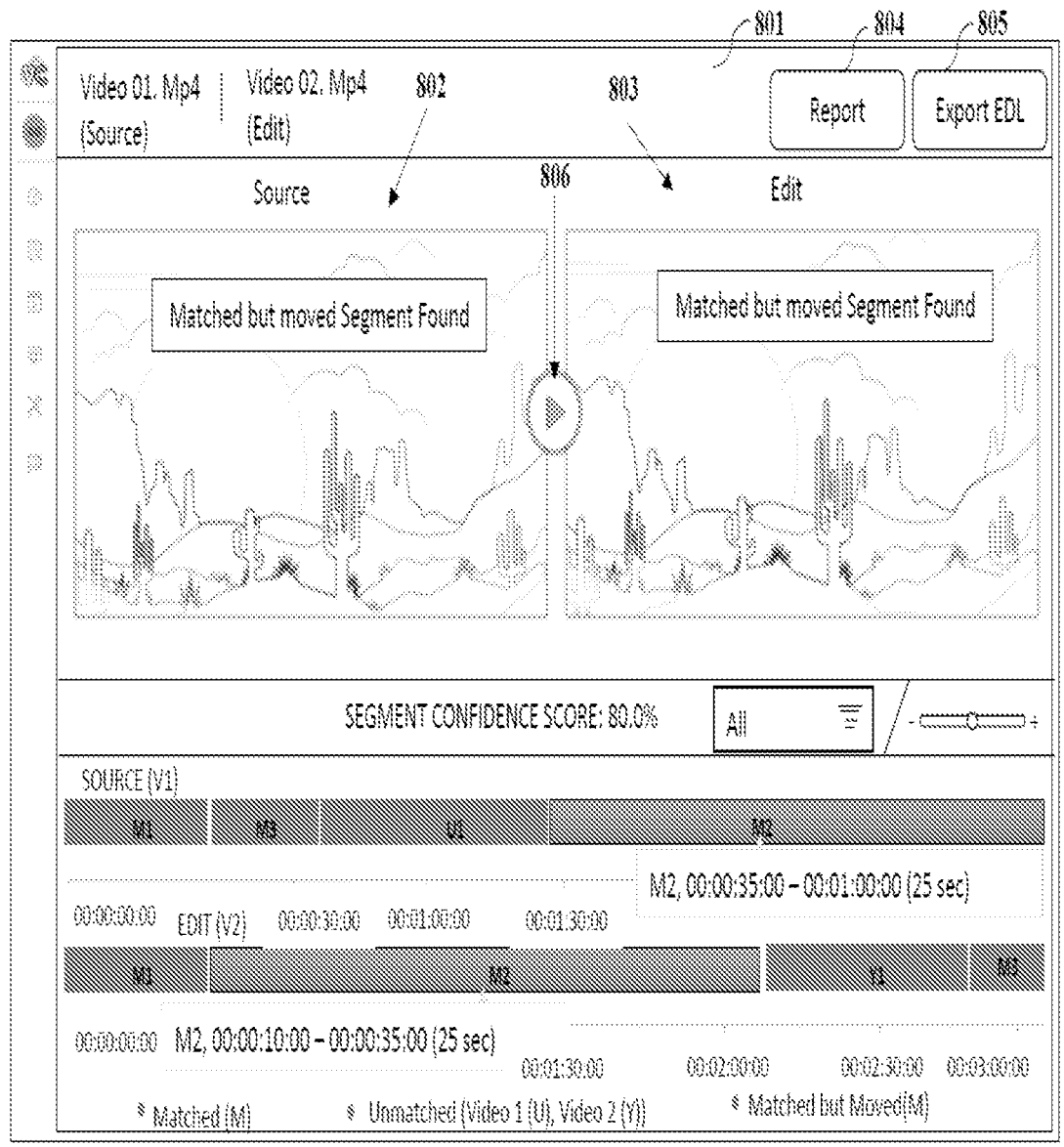
Figure 8C:
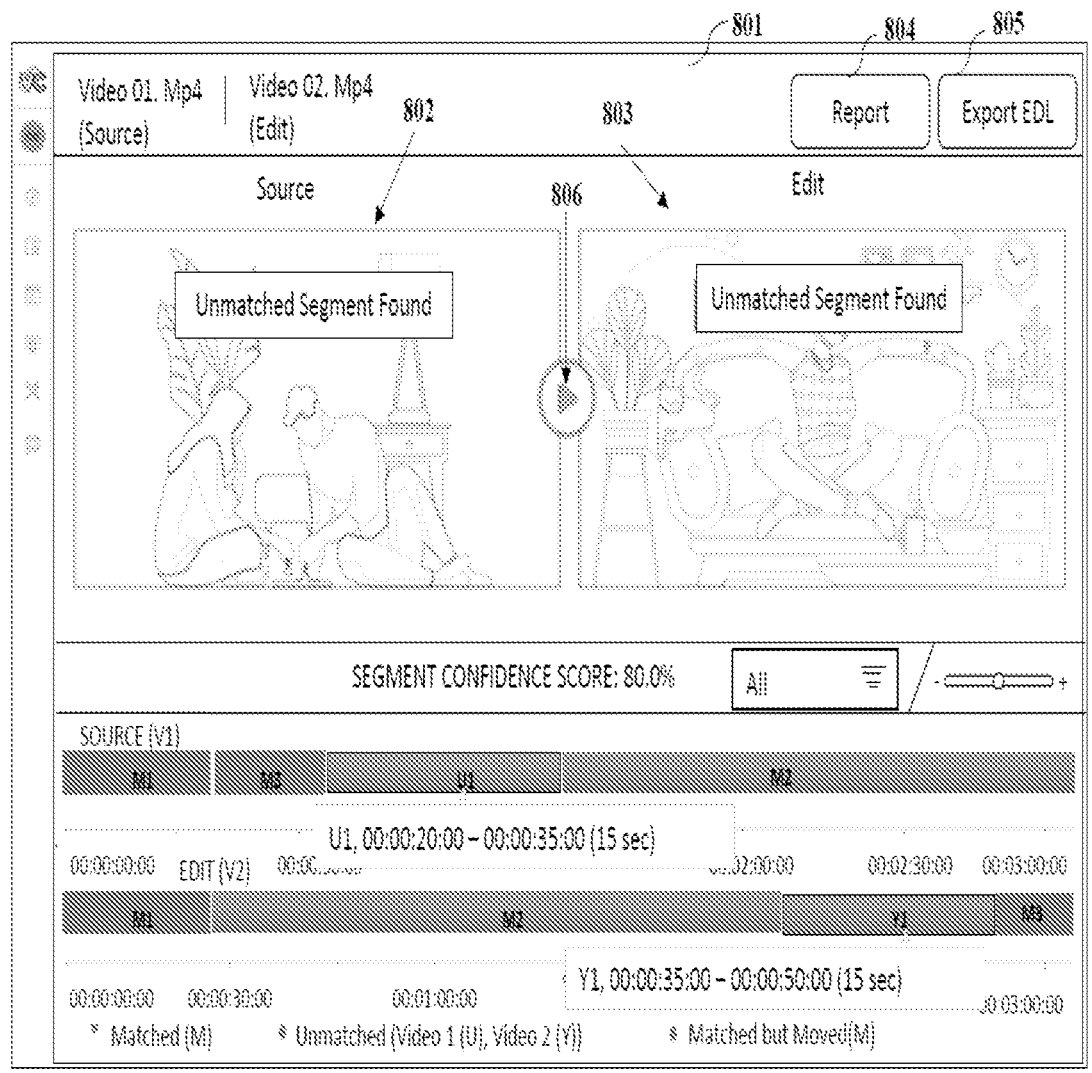
Figure 8D:
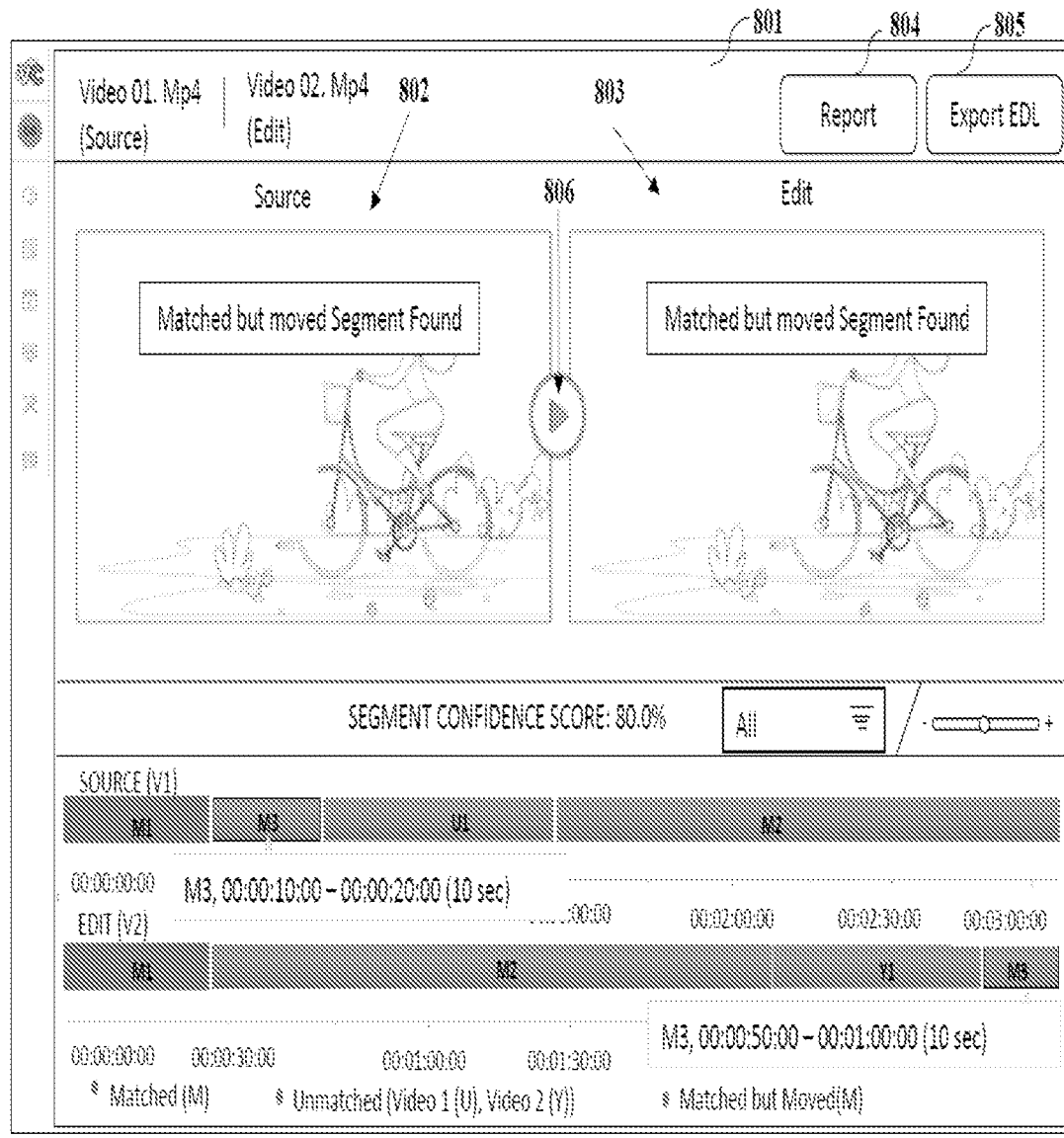

(1) Timecodes depicting edits and inserts.
  i) 00:00:00:00 00:00:21:01 00:00:00:00 00:00:21:01
    FROM CLIP NAME: video_1.mp4
    Comment: edit(match)
  ii) 00:00:31:15 00:01:31:11 00:00:21:01 00:01:20:21
    FROM CLIP NAME: video_1.mp4
    Comment: edit
  iii) 00:02:00:13 00:02:07:02 00:02:00:13 00:02:07:02
    FROM CLIP NAME: insert.mp4
    Comment: insert
(2) Timecodes depicting edits and cuts.
  i) 00:00:00:00 00:00:10:01 00:00:00:00 00:00:10:01
    FROM CLIP NAME: video_2.mp4
    COMMENT: edit
  ii) 00:00:10:01 00:00:12:00 00:00:10:01 00:00:12:00
    FROM CLIP NAME: video_1.mp4
    COMMENT: cut
  iii) 00:00:28:02 00:00:35:06 00:00:12:00 00:00:19:04
    FROM CLIP NAME: video_2.mp4
    COMMENT: edit FIG. 7C illustrates a functional block diagram of an exemplary implementation of the system 700 for determining matches between frames in media assets, for example, videos, for automating a downstream digital intermediary (DI) validation workflow using artificial intelligence, according to an embodiment of the present invention. In a DI validation workflow as illustrated in FIG. 7C, one final master video file is compared to one source video file to identify matching segments. On receiving a request for invoking the DI validation workflow through a messaging service, for example, a Kafka® messaging service executed by the Kafka® servers 704, the media comparison engine 507 is invoked for executing various functions, for example, frame extraction, signature computation, search space population, shot boundary detection, frame matching, and match summarization using the frame extractor 509, the signature computation module 510, the search space populator 511, the shot boundary extractor 512, the frame matching module 513, and the match summarizer 515 respectively as disclosed in the detailed description of FIG. 5, depending upon the process requirements to generate an output edit decision list (EDL) response.

The match summarizer 515 summarizes matches, un-matches, and movements. According to an embodiment, the media comparison engine comprises a media attributes difference extractor 518 configured to identify scale, color, and text anomalies, in operable communication with the match summarizer 515. For each matching segment, the media attributes difference extractor 518 determines differences in the segment relative to scale changes, for example, crops, zooms etc., color changes, and text anomalies. When the summarization is complete, the match summarizer 515 returns frame-accurate time codes of matched, un-matched, and moved clips and persists the output data comprising output EDLs to a database on the vision cloud platform servers 702. Example data structures representing frame-accurate time codes of matched, unmatched, and moved clips are disclosed below, where the comparison is performed between video_1.mp4 and video_2.mp4.

(1) 00:00:00:00 00:00:10:00 00:00:00:00 00:00:10:00
  FROM CLIP NAME: video_1.mp4
  COMMENT: Matched (M1)
(2) 00:00:10:00 00:00:19:02 00:00:10:00 00:00:19:02
  FROM CLIP NAME: video_2.mp4
  COMMENT: Un-Matched (M2)
(3) 00:00:19:02 00:00:30:23 00:00:50:06 00:01:02:02
  FROM CLIP NAME: video_1.mp4
  COMMENT: Moved The match summarizer 515 reports the differences in the segment relative to the scale changes, the color changes, and the text anomalies in the EDL, which are useful for archiving, finding differences between the same content made for different geographies, etc. The EDLs responses are delivered as an output via representational state transfer (REST) application programming interface (API) calls. According to an embodiment, the catalogued data is displayed on a graphical user interface for real-time visualization of matched, un-matched, and moved clips.

FIGS. 8A-8D exemplarily illustrate screenshots of graphical user interfaces (GUIs) 801 rendered by the media comparison engine, showing matched, unmatched, and moved segments of media assets, for example, videos for digital intermediary (DI) validation, according to one embodiment herein. As exemplarily illustrated in FIGS. 8A-8D, the GUIs 801 comprise a player section configured to display and play a source video file 802 and an edited version of the source video file 803 side by side for allowing viewing of real-time changes, while a viewer selects any segment or plays the video. The GUIs 801 provide a play button 806 for playing both the videos together. The player section comprises individual control elements, for example, play, pause, stop, and other player elements.

The GUIs 801 allow visualization of the results of DI validation as exemplarily illustrated in FIGS. 8A-8D. For example, the media comparison engine renders the matched segments of the videos on the GUI 801 exemplarily illustrated in FIG. 8A. In another example, the media comparison engine renders the matched but moved segments of the videos on the GUI 801 exemplarily illustrated in FIG. 8B. In another example, the media comparison engine renders the un-matched segments of the videos on the GUI 801 exemplarily illustrated in FIG. 5C. In another example, the media comparison engine renders the matched but moved segments of the videos on the GUI 801 exemplarily illustrated in FIG. 8D. The GUIs 801 also display a confidence score of the identified best match as exemplarily illustrated in FIGS. 8A-8D. The GUIs 801 further render user interface elements 804 and 805, for example, buttons, for allowing a user to generate a report showing the results of the DI validation and export the edit decision list (EDL) generated by the media comparison engine respectively.

Figure 9:
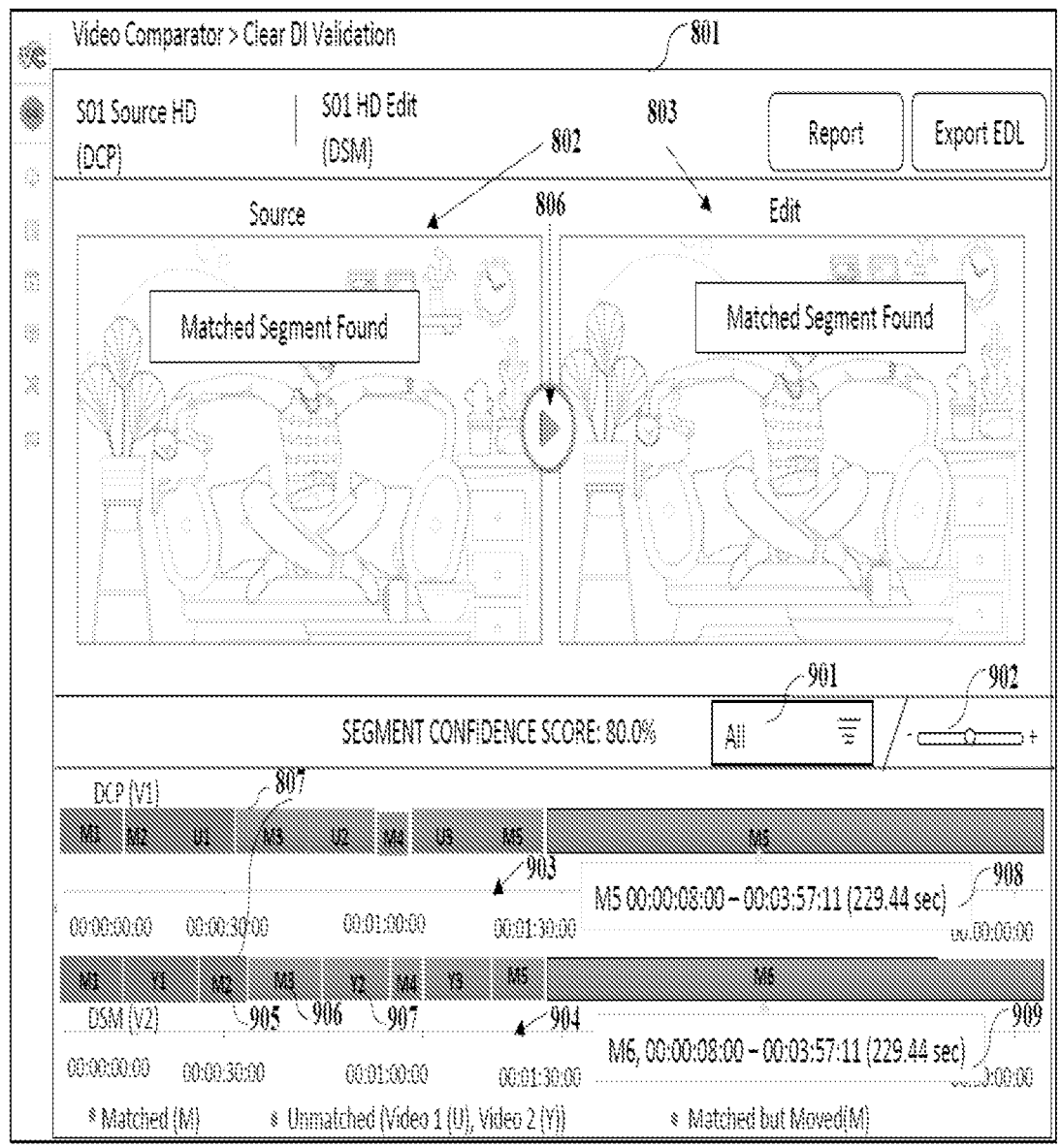
FIG. 9 exemplarily illustrates a screenshot of a graphical user interface rendered by the media comparison engine for facilitating a DI validation workflow, according to one embodiment herein.

FIG. 9 exemplarily illustrates a screenshot of a graphical user interface (GUI) 801 rendered by the media comparison engine for facilitating a digital intermediary (DI) validation workflow, according to one embodiment herein. According to an embodiment, the GUI 801 comprises a segment-specific filter 901 configured to navigate between different categories, for example, color difference, text difference, zoom difference, inserts, cuts, matches, un-matches, match but moved, etc. In another embodiment, the GUI 801 comprises a scale, pan, and zoom option 902 for handling long segmented clips and allowing mapping of clip timings based on a zoom scale. In another embodiment, the GUIs 801 further comprise parallel sliders 903 and 904 for the videos 802 and 803 being compared and played. The sliders 903 and 904 are timeline-based tracks that allow a user to conveniently access the video segments. In another embodiment, the GUIs 801 further comprise legends 807 for clearly identifying each segment. In another embodiment, the GUI 801 provides hover effects on the videos to display details. When a user mouses over or hovers an input device over portions of the sliders 903 and 904 on the GUI 801, the GUI 801 displays details, for example, time codes, of the portions in pop windows, for example, 908 and 909 as exemplarily illustrated in FIG. 9. Furthermore, according to an embodiment, the GUI 801 allows the user to access and view a matched but moved segment 905, a matched segment 906, and an un-matched segment 907 above the slider 904 provided for the edited version of the source video file.

Figure 10:
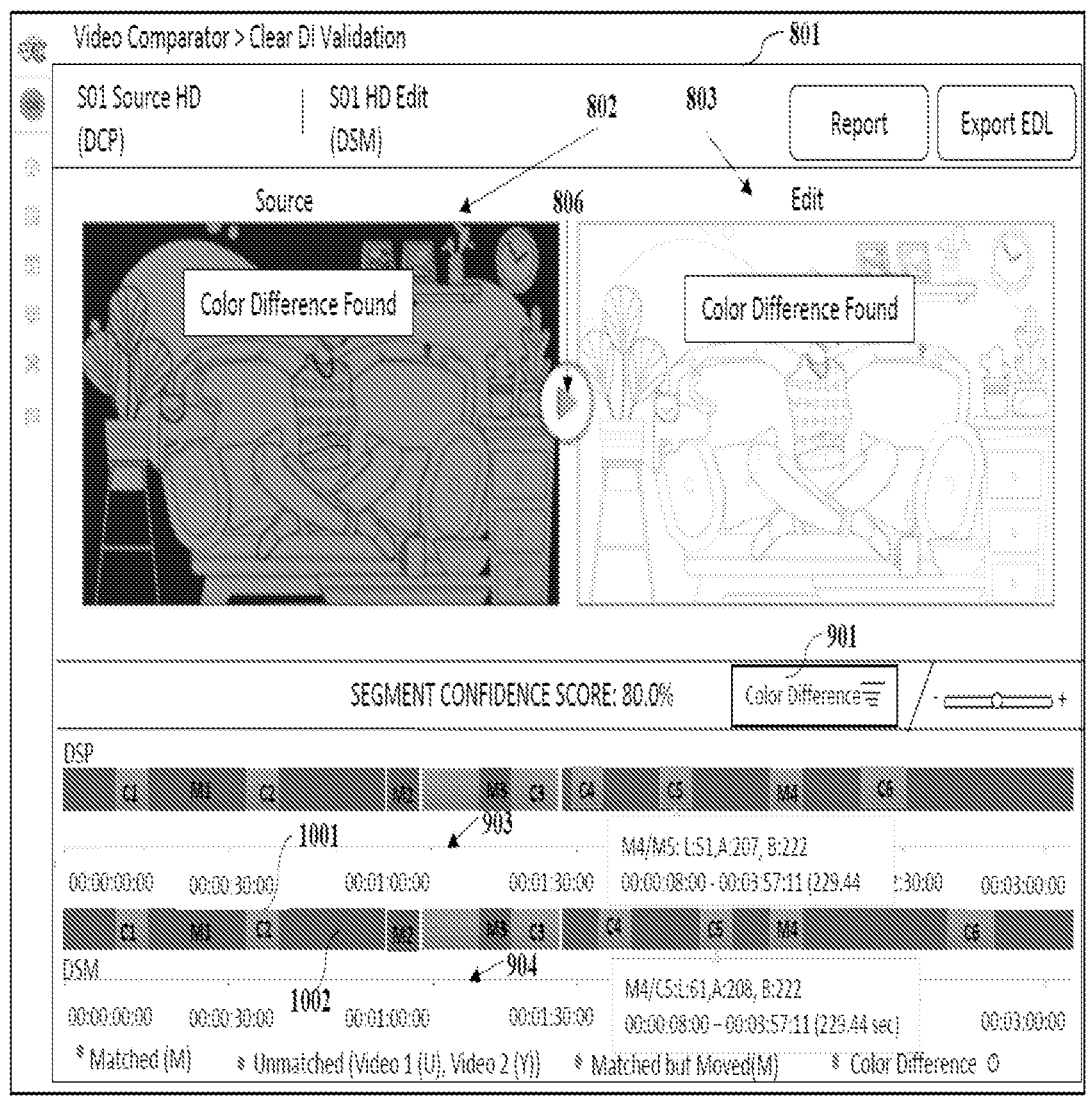
FIG. 10 exemplarily illustrates a screenshot of a graphical user interface rendered by the media comparison engine for displaying color differences between media assets, according to one embodiment herein.

FIG. 10 exemplarily illustrates a screenshot of a graphical user interface (GUI) 801 rendered by the media comparison engine for displaying color differences between media assets, according to one embodiment herein. According to an embodiment, the GUI 801 allows the user to access and view a "matched but color difference found" segment 1001 and a matched segment 1002 above the slider 904 provided for the edited version of the source video file as exemplarily illustrated in FIG. 10.

Figure 11:
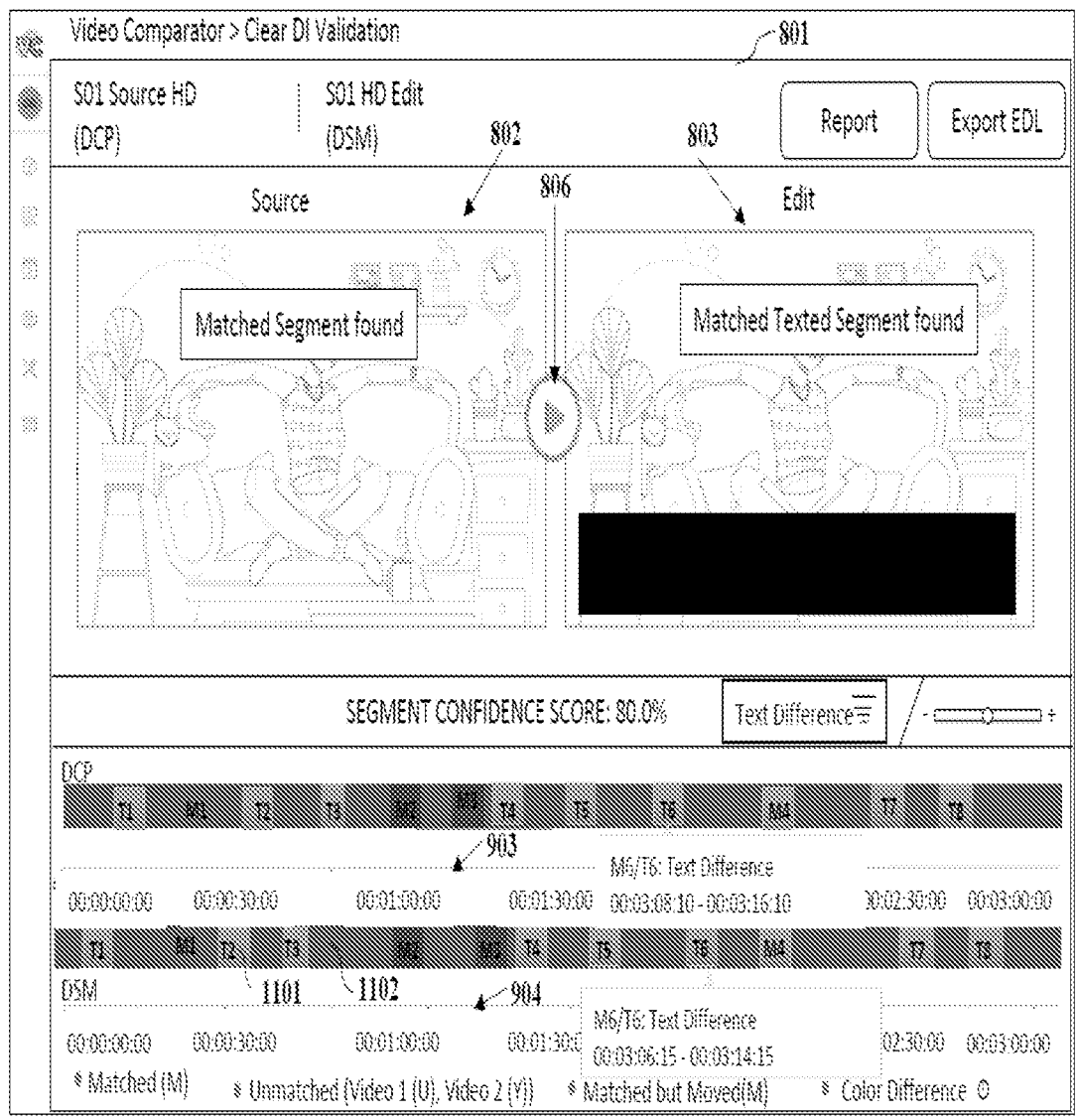
FIG. 11 exemplarily illustrates a screenshot of a graphical user interface rendered by the media comparison engine for displaying text differences between media assets, according to one embodiment herein.

FIG. 11 exemplarily illustrates a screenshot of a graphical user interface (GUI) 801 rendered by the media comparison engine for displaying text differences between media assets, according to one embodiment herein. According to an embodiment, the GUI 801 allows the user to access and view a "matched but text difference found" segment 1101 and a matched segment 1102 above the slider 904 provided for the edited version of the source video file as exemplarily illustrated in FIG. 11.

Figure 12:
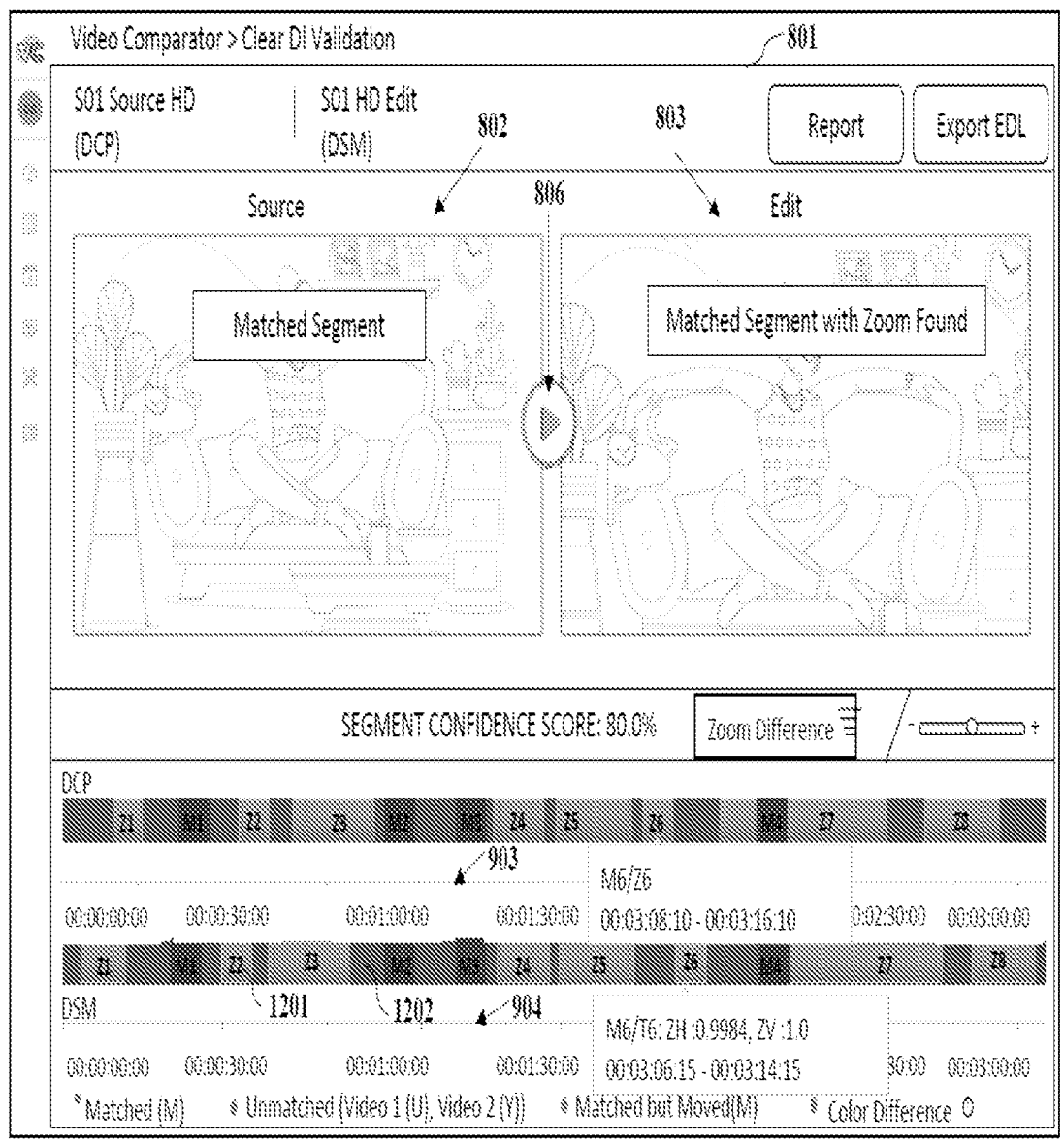
FIG. 12 exemplarily illustrates a screenshot of a graphical user interface rendered by the media comparison engine for displaying scale differences between media assets, according to one embodiment herein.

FIG. 12 exemplarily illustrates a screenshot of a graphical user interface (GUI) 801 rendered by the media comparison engine for displaying scale differences between media assets, according to one embodiment herein. According to an embodiment, the GUI 801 allows the user to access and view a "matched but zoom difference found" segment 1201 and a matched segment 1202 above the slider 904 provided for the edited version of the source video file as exemplarily illustrated in FIG. 12.

Figure 13:
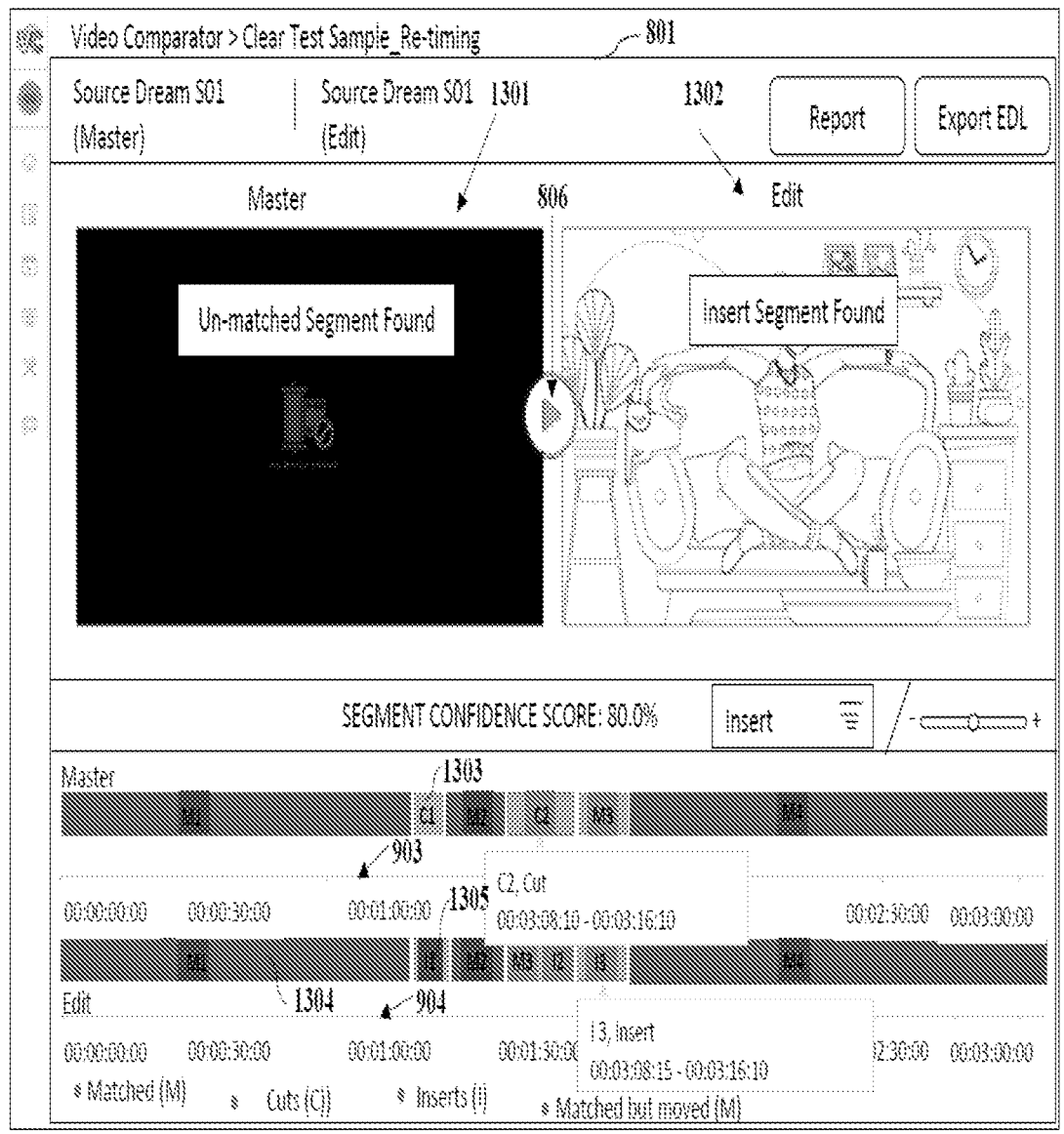
FIG. 13 exemplarily illustrates a screenshot of a graphical user interface rendered by the media comparison engine for facilitating a media subtitle retiming workflow, according to one embodiment herein.

FIG. 13 exemplarily illustrates a screenshot of a graphical user interface (GUI) 801 rendered by the media comparison engine for facilitating a media subtitle retiming workflow, according to one embodiment herein. As exemplarily illustrated in FIG. 13, the GUI 801 comprises a player section configured to display and play a master video file 1301 and an edited version of the source video file 1302 side by side for allowing viewing of real-time changes in a video subtitle retiming workflow. According to an embodiment, the GUI 801 allows the user to access and view a cut segment found 1303 above the slider 903 provided for the master video file 1301 as exemplarily illustrated in FIG. 13. Furthermore, the GUI 801 allows the user to access and view a matched segment found 1304 and an insert segment found 1305 above the slider 904 provided for the edited version of the source video file 1302 as exemplarily illustrated in FIG. 13.

Figure 14:
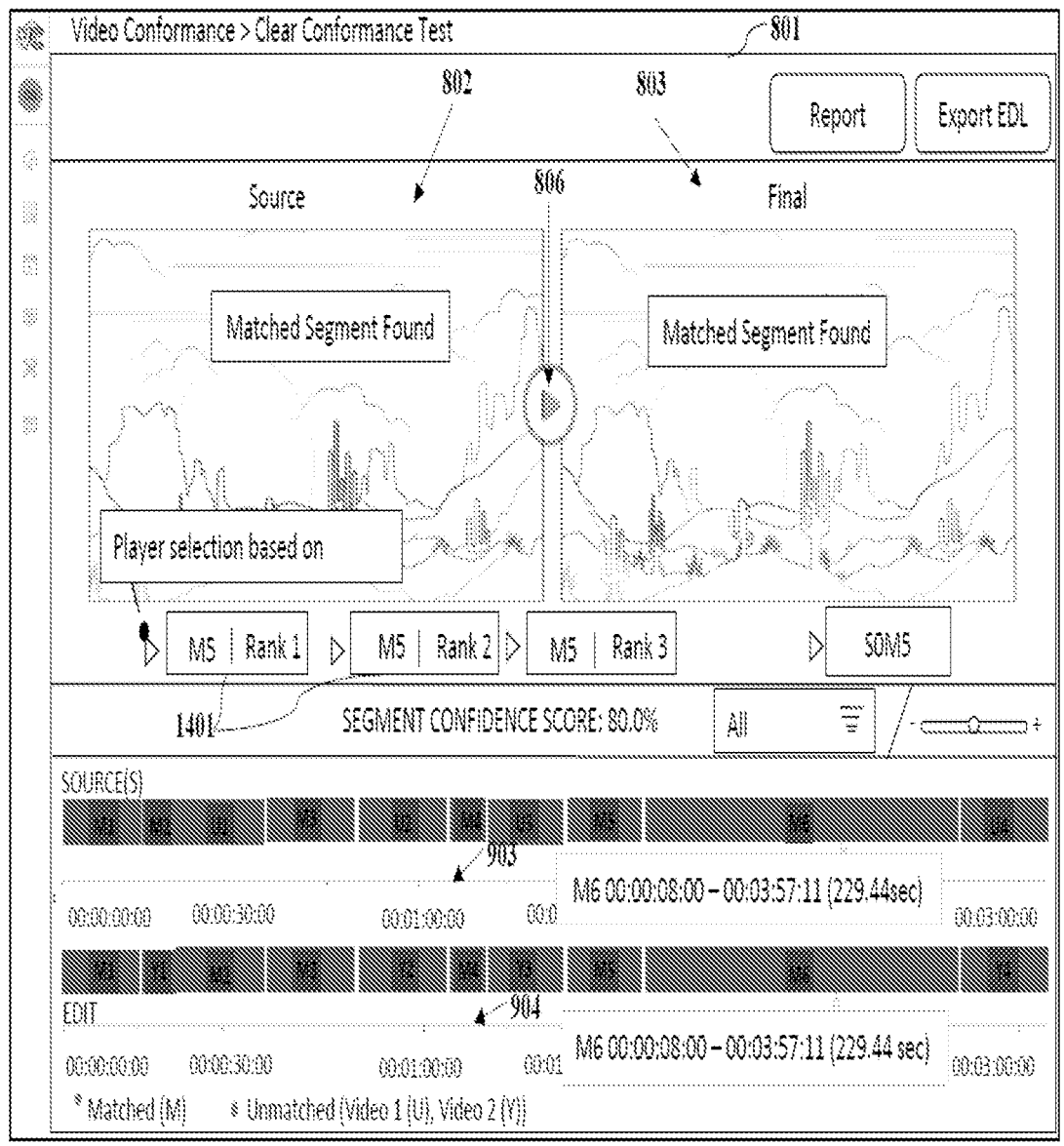
FIG. 14 exemplarily illustrates a screenshot of a graphical user interface rendered by the media comparison engine for facilitating a media conformance workflow, according to one embodiment herein.

FIG. 14 exemplarily illustrates a screenshot of a graphical user interface (GUI) 801 rendered by the media comparison engine for facilitating a media conformance workflow, according to one embodiment herein. According to an embodiment, the GUI 801 comprises ranking based play buttons 1401 for conformance and allowing a user to play matched segments found based on ranking as exemplarily illustrated in FIG. 14.

Figure 15:
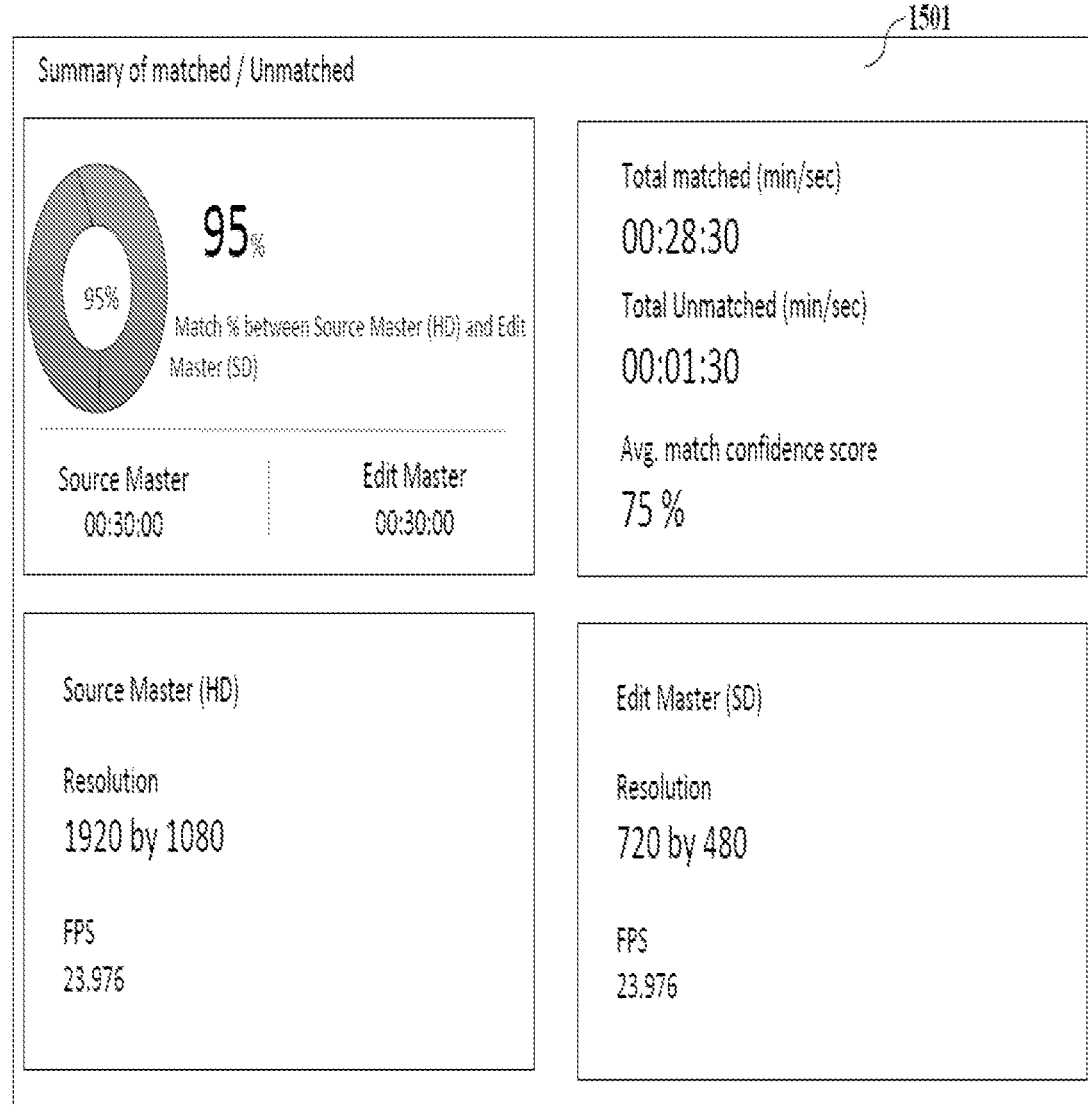
FIG. 15 exemplarily illustrates a screenshot of a graphical user interface rendered by the media comparison engine, showing a detailed summary of matched and unmatched scenes of a media asset, according to one embodiment herein.

FIG. 15 exemplarily illustrates a screenshot of a graphical user interface (GUI) 1501 rendered by the media comparison engine, showing a detailed summary of matched and unmatched scenes of a media asset, according to one embodiment herein.

In other embodiments, the GUIs rendered by the media comparison engine provide other control elements, for example, gradient markers, highlighters with text nomenclature for highlighting specific regions inside video segments, for example, to color changed frames inside matched clips. The colors are used for clearly identifying segments and allow easy navigation between each segment.

The system and the method disclosed herein match frames of two or more media assets, for example, videos, to perform various tasks such as re-telecasting of old, highly acclaimed content in high definition (HD) and 4000 (4K) screen resolutions, comparing master video files, retiming subtitles, comparing compliance edits, identifying redundancies to save space, etc. The system and the method disclosed herein execute a frame-accurate matching technique for frame-accurate subtitle retiming and DI validation, and at most off by a couple of seconds, for video conformance. The system and the method disclosed herein perform fast identification of frame matches by executing a telescopic matching technique in at least two steps, where the first step comprises identifying probable seconds that have potential source frames that may match a target master frame by creating a corpus of source frames, and the second step comprises iterating all the source frames in the identified probable seconds to determine a match.

The system and the method disclosed herein automatically detect and respond to subtle changes, for example, changes in hand movements, facial expressions, etc., in media assets, while accommodating image manipulations and edits, for example, zooms, crops, resolution changes, visual effects (VFX), color grade changes, text differences, etc. The system and the method disclosed herein categorize images as mismatched when although two images have a similar structure, there is a small change in an orientation of an object present in both the images. The system and the method disclosed herein detect content in videos when multiple different image edits, for example, visual effects, crops, zooms, color grading, text differences, resolution changes, etc., have been performed on one of the videos, but not in the other videos. The system and the method disclosed herein allow automatic verification of each frame of each of two master video files being compared for DI validation for identifying content segments that are missing, deleted, added, or edited to generate a DI validation report. The system and the method disclosed herein identify what parts of source content were selected and rendered in a master video file containing a final edited video, so that only those portions of the source content are scanned from video tapes, when a video has to be re-mastered at a high resolution, from the video tapes. The system and the method disclosed herein allow frame-accurate retiming of subtitles when a compliance edit is being performed on a master video file. The system and the method disclosed herein allow machine intelligence-based video conformance, video subtitle retiming, and DI validation for reducing human resource costs, specialized entertainment video solution (EVS) machine costs, operational overheads, time, and effort.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the methods disclosed herein. According to an embodiment, the computer programs that implement the methods and algorithms disclosed herein are stored and transmitted using a variety of media, for example, the computer-readable media in various manners. According to an embodiment, hard-wired circuitry or custom hardware is used in place of, or in combination with, software instructions for implementing the processes of various embodiments. Therefore, the embodiments are not limited to any specific combination of hardware and software. In another embodiment, various aspects of the embodiments disclosed herein are implemented in a non-programmed environment comprising documents created, for example, in a hypertext markup language (HTML), an extensible markup language (XML), or other format that render aspects of a GUI or perform other functions, when viewed in a visual area or a window of a browser program. Various aspects of the embodiments disclosed herein are implemented as programmed elements, or non-programmed elements, or any suitable combination thereof.

Where databases are described such as the media database 516 illustrated in FIG. 5, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. According to an embodiment, any number of other arrangements are employed besides those suggested by tables illustrated in the drawings or elsewhere. In another embodiment, despite any depiction of the databases as tables, other formats including relational databases, object-based models, and/or distributed databases are used to store and manipulate the data types disclosed herein. According to an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. According to an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. According to an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers. The embodiments disclosed herein are not limited to a particular computer system platform, processor, operating system, or network.

The foregoing examples and illustrative implementations of various embodiments have been provided merely for explanation and are in no way to be construed as limiting of the present invention. While the present invention has been described with reference to various illustrative implementations, techniques, embodiments, it is understood that the words, which have been used herein, are words of description and illustration, rather than words of limitation. Further, although the present invention has been described herein with reference to particular means, materials, techniques, and embodiments, the present invention is not intended to be limited to the particulars disclosed herein; rather, the present invention extends to all functionally equivalent structures, methods and uses, such as are within the scope of the appended claims. It will be understood by those skilled in the art, having the benefit of the teachings of this specification, that the present invention is capable of modifications and other embodiments may be effected and changes may be made thereto, without departing from the scope and spirit of the present invention.

We claim:

1. A system (700) for determining matches between frames in media assets for automating downstream media workflows using artificial intelligence, the system (700) comprising:

a plurality of processors (502);

a non-transitory, computer-readable storage medium (506) operably and communicatively coupled to the processors (502) and configured to store the media assets and computer program instructions executable by the processors (502); and a media comparison engine (507) configured to define the computer program instructions, which when executed by the processors (502), cause the processors (502) to:

receive a message comprising a plurality of media assets for one or more of the downstream media workflows, wherein the media assets comprise a master media asset and one or more source media assets corresponding to the master media asset;

extract source frames from each of the one or more source media assets and extract master frames constituting each of a plurality of master shots from the master media asset;

compute a plurality of signatures for each of the extracted source frames and each of the extracted master frames in a time domain;

determine an optimal search space for scanning the each of the extracted source frames of the each of the one or more source media assets;

compute boundaries of the master shots of the master media asset;

wherein the media comparison engine, for a target master frame among the extracted master frames in each of the computed boundaries of the master shots, is configured to:

perform a comparison with the each of the extracted source frames of the each of the one or more source media assets in the optimal search space using the computed signatures and determine matches of the extracted source frames with the target master frame in the optimal search space;

compute a final search space by mapping all the determined matches of the extracted source frames in the optimal search space to their corresponding time elements and including source frames of the corresponding time elements in the final search space;

compute a rate of information exchange score for each of the determined matches based on one or more of the signatures and similarity scores computed for the each of the source frames of the each of the one or more source media assets in the final search space:

identify a best match of one of the source frames of one of the one or more source media assets to the target master frame of the master media asset based on the rate of information exchange score of the each of the determined matches; and perform a comparison of the source frames subsequent to the one of the source frames in the identified best match with the master frames subsequent to the target master frame of the master media asset and determine matches of the subsequent source frames with the subsequent master frames of the master media asset; and perform course correction to latch on to the exact matching frame in an post processing step, wherein a similarity change ratio is computed between adjacent frames after every matching process, and when the similarity change ratio exceeds a certain threshold (which is more than double the threshold value), an alarm is provided and wherein a validity of the alarm is determined by searching for an image similarity score between the adjacent frames after the match;

wherein the signatures comprise frame derivatives, color information, and frame interest points, and wherein the frame interest points comprise image key points and descriptors; and wherein the media comparison engine (507) is configured to compute (a) the frame derivatives by executing a differential bashing algorithm, (b) the color information by executing a red, green, and blue (RGB) histogram algorithm, and (c) the frame interest points by executing one or more feature extraction algorithms; and wherein the one or more processors (502) is configured to determine performance of gamma correction on the each of the extracted source frames and the each of the extracted master frames prior to the computation of the frame interest points, by executing the one or more computer program instructions, and wherein the media comparison engine (507) is configured to determine the optimal search space by:

performing a frame optimization technique by computing differential hash values prior to loop across all frames in both videos to be matched to identify a unique frame by scanning each of the extracted source frames of each source;

treating or considering the unique frame as a reference frame;

checking and comparing the hash value of each subsequent frame with the reference frame to identify a new frame whose similarity score/hash value with the reference frame is less than an empirically determined pre-defined threshold;

continuing the process until all the frames or mapped to the reference frame; and wherein the optimal search space comprises a setoff reference frames; and wherein the downstream media workflows comprise workflows for (a) media conformance where the master media asset is compared with a plurality of source media assets, (b) subtitle retiming where the master media asset is compared with a single source media asset, and (c) digital intermediary validation where the master media asset is compared with a single source media asset.

2. The system (700) as claimed in claim 1, wherein the computation of the boundaries of the master shots of the master media asset by the media comparison engine (507) comprises matching color histograms of adjacent master frames of each of the master shots.

3. The system (700) as claimed in claim 1, wherein the one or more processors (502) are configured to correct the boundaries of the master shots of the master media asset using physical segments of the master media asset by executing the one or more computer program instructions.

4. The system (700) as claimed in claim 1, wherein the media comparison engine is configured to identify the best match of the one of the source frames of the one of the one or more source media assets to the target master frame of the master media asset by:
  determining probable time elements comprising potential source frames from among the source frames of the each of the one or more source media assets that are a match for the target master frame of the master media asset;
  identifying matches from among the potential source frames in the probable time elements;
  mapping the identified matches of the potential source frames to their corresponding time elements and generating a final corpus of probable matches of the source frames; and
  identifying the best match of the one of the source frames to the target master frame from among the final corpus of the probable matches of the source frames based on the rate of information exchange score.

5. The system (700) as claimed in claim 1, wherein the processors (502) are configured to execute a backward frame matching routine to determine whether any of the master frames before the target master frame finds a match in a same one of the one or more source media assets by executing the one or more computer program instructions.

6. The system (700) as claimed in claim 1, wherein the processors (502) are configured to generate a match summary list comprising an index of matching master frames of the master media asset, indices of the source frames of the one or more source media assets matched to the target master frame of the master media asset, a confidence score of the identified best match, scale differences between the determined best matches, and associated metadata based on the downstream media workflows, by executing one or more computer program instructions.

7. The system (700) as claimed in claim 1, wherein the processors (502) are configured to render a graphical user interface on a user device by executing one or more computer program instructions, and wherein the graphical user interface comprises one or more of:
  a player section configured to play the master frames of the master media asset and the source frames of each of the one or more source media assets side by side for allowing viewing of real-time changes;
  segment-specific filters corresponding to a plurality of categories for navigation between the categories on the graphical user interface, wherein the categories comprise color difference, text difference, zoom difference, inserts, cuts, matches, mismatches, and match with movement;
  a highlighter with text nomenclature for highlighting a specific region inside segments of the media assets; and
  one or more of a plurality of control elements for managing the media assets, wherein the control elements comprise pan, zoom, a clip timing mapper, hover, legends, timeline-based tracks, ranking-based play elements, and a list export element.

8. The system (700) as claimed in claim 1, wherein the media comparison engine comprises a course correction module, and wherein the course correction module is configured, through one or more program instructions that are executed by the one or more processors, to:
  a) initiate a course correction check for each of the matched blocks, to identify a presence of an unmatched block of source frames and a presence of better matches for existing matched edit frames corresponding to the matched source block following the matched source block, after finding all the matches by comparing the image similarity scores;
  b) rearranging the matched source-edit frame blocks, when the presence of an unmatched block of source frames and the presence of better matches for existing matched edit frames are found or identified;
  c) repeating the abovementioned processes a) and b) sequentially until all the matching blocks are spanned, and the course correction check is no more required for each of the matching blocks.

9. The system (700) as claimed in claim 1, wherein the media comparison engine is configured through one or more program instructions that are executed by the one or more processors, to compute the RIE score for identifying matching frames of two different frame rates, and wherein a rate of change between adjacent source frames over a predefined duration of time is accumulated to determine the best possible match for a target master frame, and wherein the media comparison engine is configured to identify the best match of one of the source frames of the source media asset to the target master frame of the master media asset by determining probable time periods comprising potential source frames from among the source frames of each source media asset that are found as a match for the target master frame of the master media asset by creating a corpus of source frames, and wherein the media comparison engine identifies matches from among the potential source frames in the probable time periods, and wherein the media comparison engine maps the identified matches of the potential source frames to their corresponding time periods and generates a final corpus of probable matches of the source frames, and wherein the media comparison engine identifies the best match of one of the source frames to the target master frame from among the final corpus of the probable matches of the source frames based on the RIE score.

10. A method for determining matches between frames in media assets for automating downstream media workflows using artificial intelligence, the method comprising:
  receiving (101), by a media comparison engine (507) executable by a plurality of processors (502), a message comprising a plurality of media assets for one or more of the downstream media workflows, wherein the media assets comprise a master media asset and one or more source media assets corresponding to the master media asset;
  extracting (102) source frames from each of the one or more source media assets and extracting master frames constituting each of a plurality of master shots from the master media asset, by the media comparison engine (507);

computing (103) a plurality of signatures for each of the extracted source frames and each of the extracted master frames in a time domain by the media comparison engine (507);

determining (104) an optimal search space for scanning the each of the extracted source frames of the each of the one or more source media assets by the media comparison engine (507);

computing (105) boundaries of the master shots of the master media asset by the media comparison engine (507);

wherein the media comparison engine, for a target master frame among the extracted master frames in each of the computed boundaries of the master shots (106), is configured for:

performing (106a) a comparison with the each of the extracted source frames of the each of the one or more source media assets in the optimal search space using the computed signatures and determining matches of the extracted source frames with the target master frame in the optimal search space, by the media comparison engine (507);

computing (106b) a final search space by mapping all the determined matches of the extracted source frames in the optimal search space to their corresponding time elements and including source frames of the corresponding time elements in the final search space, by the media comparison engine (507);

computing (106c) a rate of information exchange score for each of the determined matches based on one or more of the signatures and similarity scores computed for the each of the source frames of the each of the one or more source media assets in the final search space;

identifying (106d) a best match of one of the source frames of one of the one or more source media assets to the target master frame of the master media asset by the media comparison engine (507) based on the rate of information exchange score of the each of the determined matches; and performing (106e) a comparison of the source frames subsequent to the one of the source frames of the one or more source media assets in the identified best match with the master frames subsequent to the target master frame of the master media asset and determining matches of the subsequent source frames with the subsequent master frames of the master media asset by the media comparison engine (507);

perform course correction to latch on to the exact matching frame in a post processing step, wherein a similarity change ratio is computed between adjacent frames after every matching process, and when the similarity change ratio exceeds a certain threshold (which is more than double the threshold value), an alarm is provided and wherein a validity of the alarm is determined by searching for an image similarity score between the adjacent frames after the match;

determining performance of gamma correction on the each of the extracted source frames and the each of the extracted master frames by the media comparison engine (507) prior to the computation of the frame interest points wherein the signatures comprise frame derivatives computed by executing a differential hashing algorithm, color information computed by executing a red, green, and blue (RGB) histogram algorithm, and frame interest points computed by executing one or more feature extraction algorithms, and wherein the frame interest points comprise image key points and descriptors; and wherein the determination of the optimal search space by the media comparison engine (507) comprises:

performing a frame optimization technique by computing differential bash values prior to loop across all frames in both videos to be matched to identify a unique frame by scanning each of the extracted source frames of each source;

treating or considering the unique frame as a reference frame:

checking and comparing the hash value of each subsequent frame with the reference frame to identify a new frame whose similarity score/hash value with the reference frame is less than an empirically determined pre-defined threshold; continuing the process until all the frames or mapped to the reference frame; and wherein the optimal search space comprises a set of reference frames.

11. The method as claimed in claim 10, wherein the computation of the boundaries of the master shots of the master media asset comprises matching color histograms of adjacent master frames of each of the master shots by the media comparison engine (507).

12. The method as claimed in claim 10, comprises correcting the boundaries of the master shots of the master media asset by the media comparison engine (507) using physical segments of the master media asset.

13. The method as claimed in claim 10, wherein the identification of the best match of the one of the source frames of the one of the one or more source media assets to the target master frame of the master media asset comprises:

determining, by the media comparison engine (507), probable time elements comprising potential source frames from among the source frames of the each of the one or more source media assets that are a match for the target master frame of the master media asset;

identifying matches from among the potential source frames in the probable time elements, by the media comparison engine (507);

mapping the identified matches of the potential source frames to their corresponding time elements and generating a final corpus of probable matches of the source frames, by the media comparison engine (507); and identifying the best match of the one of the source frames to the target master frame from among the final corpus of the probable matches of the source frames by the media comparison engine (507) based on the rate of information exchange score.

14. The method as claimed in claim 10, comprises executing a backward frame matching routine by the media comparison engine (507) to determine whether any of the master frames before the target master frame finds a match in a same one of the one or more source media assets.

15. The method as claimed in claim 10, comprises generating, by the media comparison engine (507), a match summary list comprising an index of matching master frames of the master media asset, indices of the source frames of the one or more source media assets matched to the target master frame of the master media asset, a confidence score of the identified best match, scale differences between the determined best matches, and associated metadata based on the downstream media workflows.

16. The method as claimed in claim 10, comprising rendering a graphical user interface on a user device by the media comparison engine (507), wherein the graphical user interface comprises one or more of:
- a player section configured to play the master frames of the master media asset and the source frames of each of the one or more source media assets side by side for allowing viewing of real-time changes;
- segment-specific filters corresponding to a plurality of categories for navigation between the categories on the graphical user interface, wherein the categories comprise color difference, text difference, zoom difference, inserts, cuts, matches, mismatches, and match with movement;
- a highlighter with text nomenclature for highlighting a specific region inside segments of the media assets; and
- one or more of a plurality of control elements for managing the media assets, wherein the control elements comprise pan, zoom, a clip timing mapper, hover, legends, timeline-based tracks, ranking-based play elements, and a list export element.

17. The method as claimed in claim 10, wherein the downstream media workflows comprise workflows for (a) media conformance where the master media asset is compared with a plurality of source media assets, (b) subtitle retiming where the master media asset is compared with a single source media asset, and (c) digital intermediary validation where the master media asset is compared with a single source media asset.

18. The method as claimed in claim 10, wherein the media comparison engine comprises a course correction module, and wherein the course correction module is configured, through one or more program instructions that are executed by the one or more processors, to;
   a) initiate a course correction check for each of the matched blocks, to identify a presence of an unmatched block of source frames and a presence of better matches for existing matched edit frames corresponding to the matched source block following the matched source block, after finding all the matches by comparing the image similarity scores;
   b) rearranging the matched source-edit frame blocks, when the presence of an unmatched block of source frames and the presence of better matches for existing matched edit frames are found or identified; and
   c) repeating the abovementioned processes a) and b) sequentially until all the matching blocks are spanned, and the course correction check is no more required for each of the matching blocks.

* * * * *